United States Patent [19]
Takeda et al.

[11] Patent Number: 5,522,269
[45] Date of Patent: Jun. 4, 1996

[54] APPARATUS AND METHOD FOR TRANSDUCING TORQUE APPLIED TO A MAGNETOSTRICTIVE SHAFT WHILE MINIMIZING TEMPERATURE INDUCED VARIATIONS

[75] Inventors: Akinori Takeda; Youichi Katahira, both of Atsugi, Japan

[73] Assignee: Unisia Jecs Corporation, Atsugi, Japan

[21] Appl. No.: 237,100

[22] Filed: May 3, 1994

[30] Foreign Application Priority Data

May 7, 1993 [JP] Japan ................................. 5-131173
Feb. 28, 1994 [JP] Japan ................................. 6-054629

[51] Int. Cl.$^6$ ................. G01L 3/10; G01B 7/24; G01R 33/18
[52] U.S. Cl. ................ 73/862.333; 324/209; 324/225; 324/233
[58] Field of Search ................. 324/209, 225, 324/234, 238, 239, 233; 73/862.333, 862.331, 862.334, 862.335, 862.336, DIG. 2, 779

[56] References Cited

U.S. PATENT DOCUMENTS

| | | | |
|---|---|---|---|
| 4,013,911 | 3/1977 | Fujiwara et al. | 324/207.17 |
| 4,414,855 | 11/1983 | Iwasaki | 324/209 |
| 4,839,590 | 6/1989 | Koski et al. | 324/209 |
| 5,307,690 | 5/1994 | Hanazawa | 73/862.333 |
| 5,315,881 | 5/1994 | Savage et al. | 73/862.333 |

FOREIGN PATENT DOCUMENTS

5-32678  1/1993  Japan .

*Primary Examiner*—Sandra L. O'Shea
*Assistant Examiner*—Jay M. Patidar
*Attorney, Agent, or Firm*—Foley & Lardner

[57] ABSTRACT

In an apparatus and method for generating a signal corresponding to a torque applied to a rotatable shaft according to the present invention, a compensation for a change in temperature causing the change in characteristics of the circuit elements including a magnetostriction shaft is carried out. In a preferred embodiment, a posistor whose resistance value is increased as the temperature is increased with respect to a normal temperature (20° C.) is used for an input temperature sensitive resistor of an inverting amplifier connected to a center tap of a half bridge circuit constituted by a pair of coils constituting a torque sensor having the magnetostriction shaft so that an amplification factor of the inverting amplifier is adjusted so as to accord with the change in the temperature. When no torque is applied to the shaft, the center tap of the half bridge circuit provides no signal (zero voltage), this signal indicating a magnitude of a voltage signal generated due to a phase difference between applied triangular waveform voltages to the pair of coils with respect to the phase of a reference signal.

27 Claims, 17 Drawing Sheets

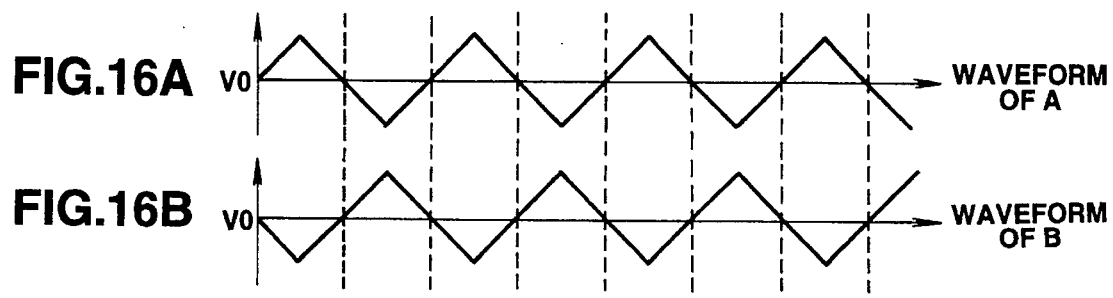
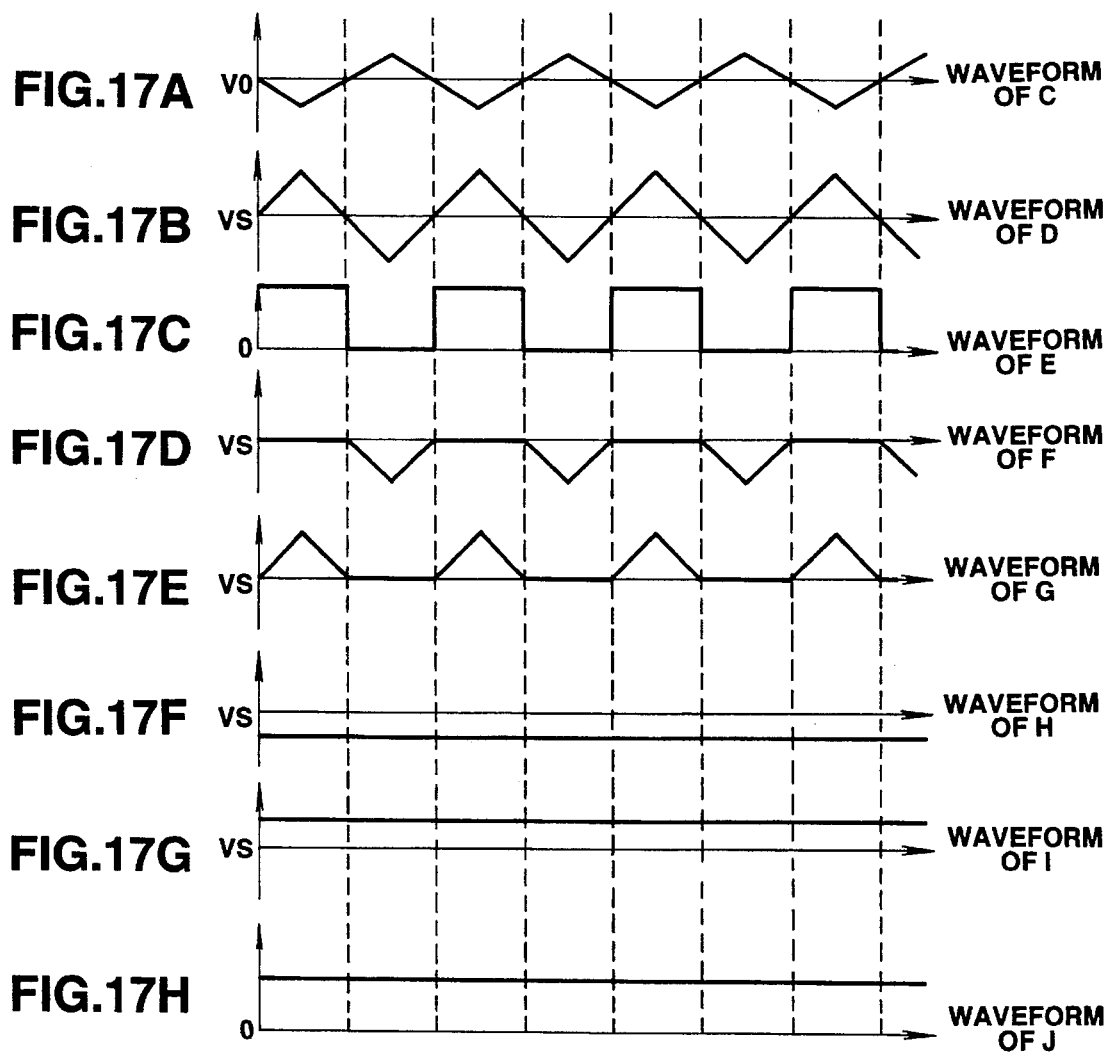

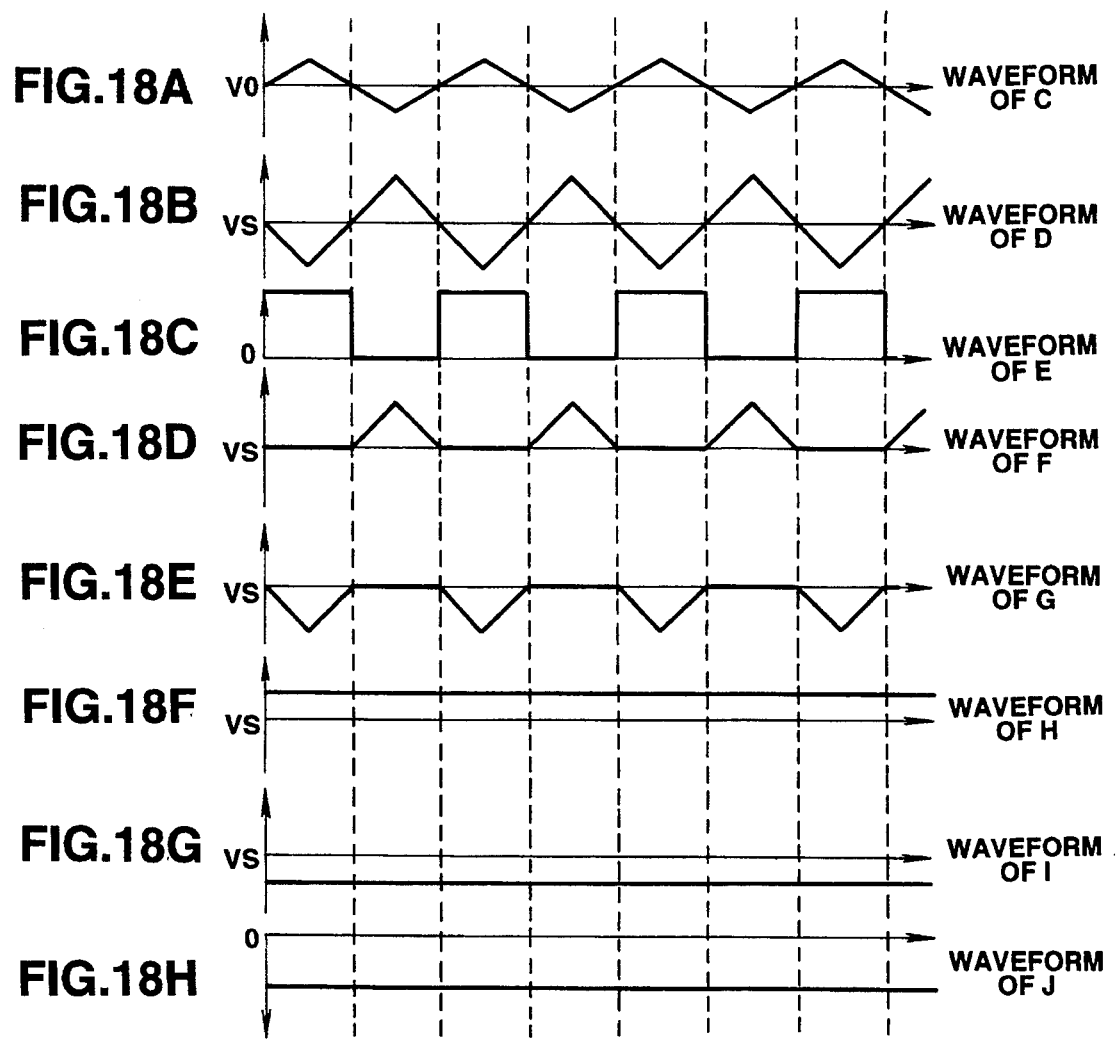

APPARATUS AND METHOD FOR TRANSDUCING TORQUE APPLIED TO A MAGNETOSTRICTIVE SHAFT WHILE MINIMIZING TEMPERATURE INDUCED VARIATIONS

BACKGROUND OF THE INVENTION

1. Field of the Invention

The present invention relates to an apparatus for generating a signal corresponding a torque applied to a rotatable body such as a output shaft of an vehicle mounted engine and method therefor.

2. Description of the Background Art

Recently, torque-electrical transducing apparatuses have been proposed, each of which detects a torque applied to an output shaft in order to appropriate a speed gear timing in an automatic transmission equipped in an automative vehicle.

A United States patent application Ser. No. 07/969,056 filed on Oct. 30, 1992 (which corresponds to a German Patent Application No. P 42 37 416. 2 filed in Germany on Nov. 5, 1992, now U.S. Pat. No. 5,419,206) exemplifies one of the previously proposed torque-electrical transducing apparatuses.

A pair of magnetic anisotropic portions are formed on an outer periphery of a magnetostriction shaft, a pair of detection coils coupled in a full bridge circuit together with an adjustment resistor, and a phase detector is so constructed as to detect a phase of a signal amplified by means of the differential amplifier, these elements constituting the previously proposed torque-electrical transducing apparatus.

SUMMARY OF THE INVENTION

It is a principal object of the present invention to provide an apparatus and method for generating a signal corresponding to a torque applied to a rotatable body such as an output shaft of an automotive mounted engine which can achieve higher accuracy and stability of determining a magnitude and a direction of a torque applied to the rotatable body such as the output shaft and can provide more reliable data of the torque with ambient temperature change with respect to a normal temperature taken into account.

The above-described object can be achieved by providing an apparatus comprising: a) sensing means having a shaft portion and a pair of coil portions, said shaft portion axially interposed between each end of a rotatable shaft and said pair of coil portions constituting a series-connected half bridge circuit, each coil portion having a self inductance varied in accordance with a magnitude and direction of a torque applied to said shaft portion; b) triangular waveform generating means for generating a pair of triangular waveform alternating signals having phases mutually different from one another by approximately 180 degrees and having the approximately same frequencies and for applying the pair of triangular waveform alternating signals to both ends of the half bridge circuit so that a center tap of said half bridge circuit provides no signal when no torque is applied to the shaft portion of the sensing means via said rotatable shaft; c) phase detecting means for detecting an amplitude of a signal caused by a phase difference between the applied pair of triangular waveform alternating signals at the center tap with respect to a reference signal derived from said triangular waveform generating means and for outputting separate signals having the same polarities and indicative of the amplitude of the signal at the center tap caused by the phase difference from that of the reference signal; d) normalization processing means for providing a normalized DC voltage signal according to a difference in amplitudes of the separate signals output from said phase detecting means, an amplitude and polarity of said DC voltage signal corresponding to the magnitude and direction of the torque applied to said shaft portion of sensing means via said rotatable shaft; and e) temperature change compensating means for compensating a variation in the normalized DC voltage signal from the processing means due to a change of characteristics of each means caused by the change in the temperature with respect to a normal temperature.

The above-described object can also be achieved by providing a structure of apparatus, comprising: a) sensing circuit means, disposed around a torque sensor, said torque sensor having a magnetostriction shaft around which a pair of coil portions constituting a series-connected half bridge circuit are wound, for operatively generating and outputting an analog signal having an amplitude corresponding to a magnitude of a torque applied to said magnetostriction shaft via a rotatable shaft and having a polarity corresponding to a direction of the torque, said sensing circuit means being set to generate and output a zero signal when an ambient temperature of the sensing circuit means is a normal temperature and when no torque is applied to the mannetostriction shaft via the rotatable shaft; and b) temperature change compensating means, disposed in said sensing circuit means, for operatively compensating an error of the analog signal so as to eliminate the error generated due to an occurrence of a change in the ambient temperature with respect to the normal tgemperature.

The above-described object can also be achieved by providing a method for generating a torque corresponding signal, comprising the steps of: a) providing sensing means having a shaft portion and a pair of coil portions, said shaft portion axially interposed between each end of a rotatable shaft and said pair of coil portions constituting a series-connected half bridge circuit, each coil portion having a variable inductance varied in accordance with a magnitude and direction of a torque applied to said shaft portion; b) generating a pair of triangular waveforms having phases mutually different from one another by 180 degrees and having the same frequencies and for applying the pair of triangular waveform voltages to-both ends of the half bridge so that a center tap of said half bridge circuit provides no voltage signal when no torque is applied to the shaft portion of the sensing means; c) detecting a phase of the voltage signal derived from the center tap with respect to a reference voltage signal derived from a triangular waveform voltage generator and for outputting a voltage signal indicative of the phase difference from the reference signal; d) providing a normalized DC voltage signal according to the voltage signal output at said step c), an amplitude of said DC voltage signal corresponding to the magnitude and direction of the torque applied to said shaft portion of sensing means; and e) compensating a variation in the DC voltage signal derived at the step d) due to a change of characteristics of each circuit caused by the change in the temperature with respect to a normal temperature.

The inventors have discovered that since ambient temperatures around the magnetostriction shaft 2 and the pair of excitation and detection coils 9 and 10 are varied in a temperature range from about −40° C. to about 80° C. and respective electronic parts constituting the apparatus have their own inherent temperature-dependent characteristics, although the same torque is applied to the magnetostriction shaft 2 in a case where the output voltage at the normal temperature of 20° C. is a criterion of determining a magnitude and a direction of the torque, the voltage value of the normalized output voltage J is slightly different according to the ambient temperatures, i.e., an error of the final output voltage signal J is involved.

Therefore, a basic concept of the present invention is to compensate for the characteristic changes in the apparatus for generating a torque corresponding signal due to the change in the ambient temperatures with respect to the normal temperature.

BRIEF DESCRIPTION OF THE DRAWINGS

FIGS. 16A and 16B are integrally a waveform chart representing a triangular waveform applied across each detection coil from a triangular waveform generation circuit.

FIGS. 17A through 17H are integrally a waveform timing chart representing a waveform generated in each circuit when a torque is applied to the magnetostriction shaft in an arrow-marked direction of T in FIG. 14.

FIGS. 18A through 18H are integrally a waveform timing chart representing a waveform generated and output in each circuit shown in FIG. 15 when a torque is applied to the magnetostriction shaft in an opposite direction to the arrow-marked direction of T in FIG. 14.

BEST MODE FOR CARRYING OUT THE INVENTION

Reference will hereinafter be made to the drawings in order to facilitate a better understanding of the present invention.

Before explaining a torque corresponding signal generating apparatus and method therefor according to the present invention, a previously proposed torque-electrical transducing apparatus will be explained below.

Figure 15:
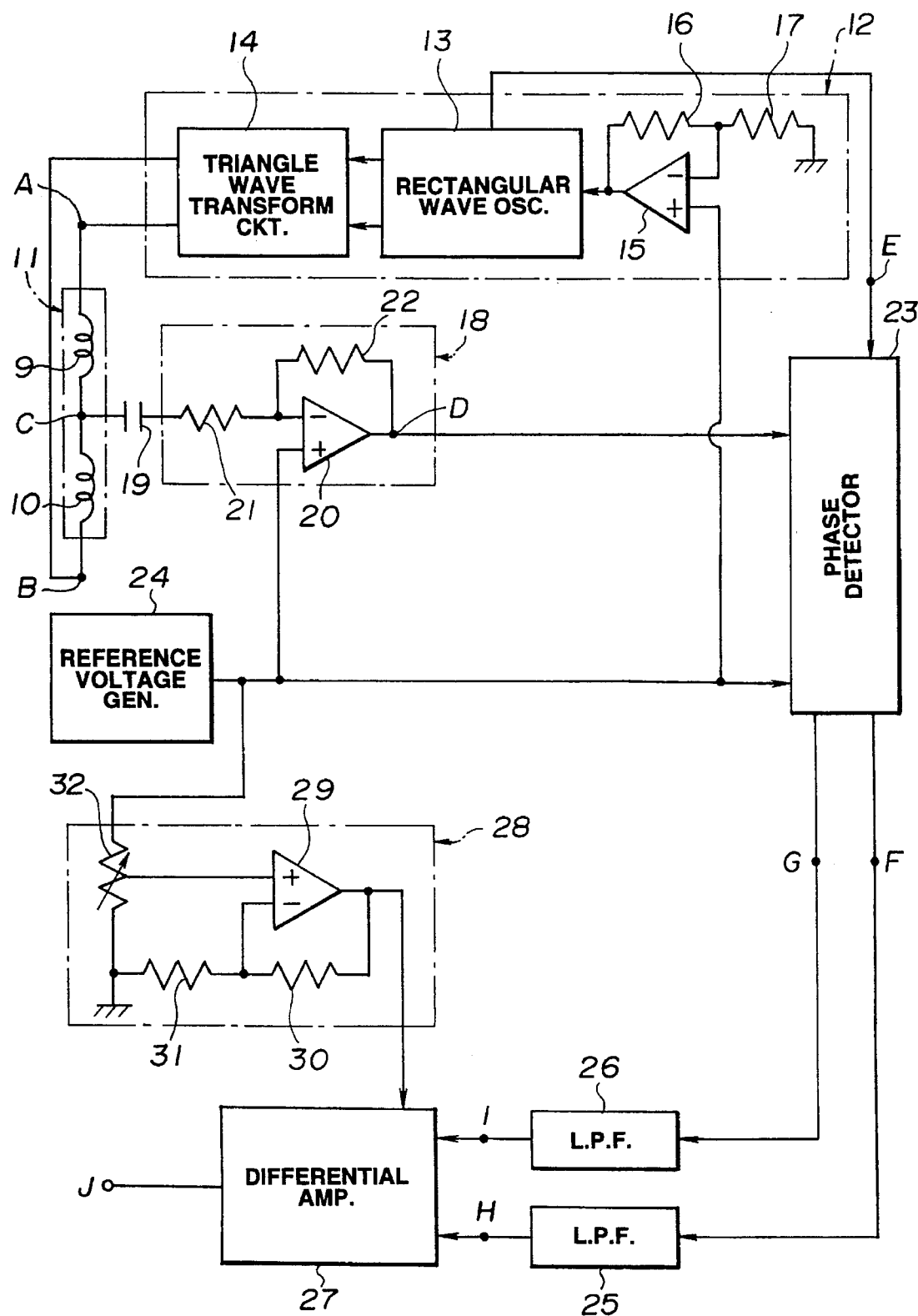
FIG. 15 is a circuit block diagram of one of previously proposed torque-electrical transducing apparatuses.

It is noted that FIG. 15 shows a general concept of a circuit structure of the previously proposed torque-electrical transducing apparatus disclosed in a Japanese Patent Application No. Heisei 5-32678 filed in Japan on Jan. 28, 1993.

Figure 14:
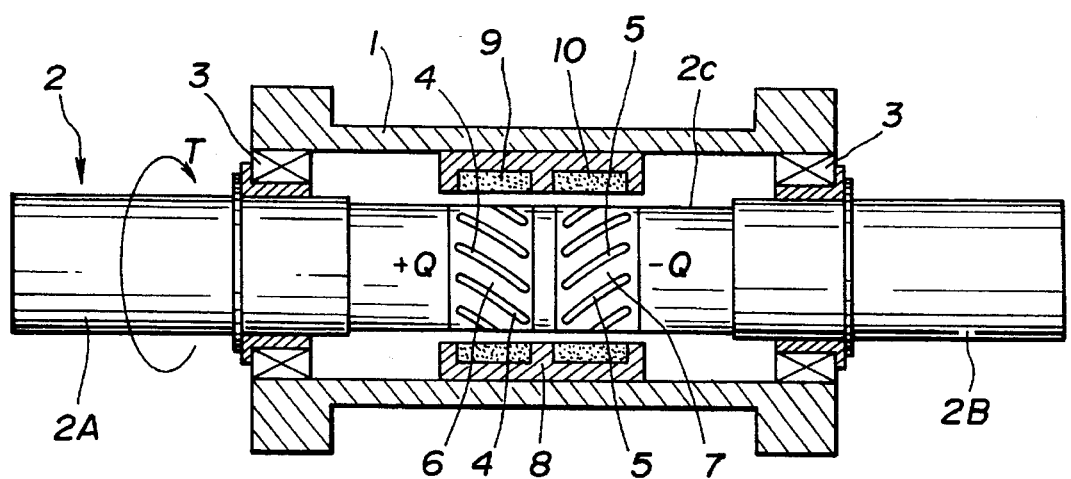
FIG. 14 is a longitudinally cross sectional view of a sensor main body used in the torque corresponding signal generating apparatus.

In addition, FIG. 14 shows a structure of a magnetostriction type torque sensor used in the torque-electrical transducing apparatus according to the present invention and in the previously proposed torque-electrical transducing apparatus shown in FIG. 15.

Furthermore, a United States patent application Ser. No. 07/969,056 now U.S. Pat. No. 5,419,206 exemplifies the magnetostriction type torque sensor shown in FIG. 14 which is herein incorporated by reference.

In FIG. 14, a casing 1 is made of a nonmagnetic material, is formed in a stepped cylindrical shape, and is fixed onto a casing of an associated automatic transmission (not shown).

A magnetostriction shaft 2 is disposed within the casing 1. The magnetostriction shaft 2 is formed in a cylindrical shape and is made of such as a stainless steel. Both ends 2A and 2B are projected out of the casing 1 so as to constitute the output shaft of the automotive mounted engine (not shown). In addition, an intermediate portion of the magnetostriction shaft 2 in the axial direction located within the casing 1 is formed of a slit forming portion 2C. First slit grooves 4, 4, . . . are inscribed in a downward direction by 45 degrees and second slit grooves 5, 5, . . . are inscribed in an upward direction by 45 degrees. Both slit grooves 4 and 5 are spaced apart from each other with a given interval of distance.

A first magnetic anisotropic portion 6 and a second magnetic anisotropic portion 7 are located in the casing 1 and are formed with a space apart from each other in an axial direction at an outer peripheral side of the magnetostriction shaft 2. The magnetic anisotropic portions 6 and 7 are formed with a thermal treatment of a coated magnetic material made of, for example Fe (83%) and Al (13%) on an outer peripheral surface of the slit forming portion 2C of the magnetostriction shaft 2.

In addition, the first anisotropic portion 6 between the respective first slit grooves 4 is formed and the second anisotropic portion 7 is formed between the respective second slit grooves 5. A magnetic path caused by the first and second anisotropic portions 6 and 7 is formed.

A magnetic core material 8 is fixed on an inner peripheral surface of the casing 1 placed on an outer peripheral Side of the slit forming portion 2C. The core material 8 is disposed with detection coils 9 and 10 described later spaced apart from each other in its axial direction.

A first excitation and detection coil and second excitation and detection coils 9 and 10 are mounted on an outer peripheral side of the magnetostriction shaft 2 opposing to the first and second magnetic anisotropic portions 6 and 7, respectively. A coil bobbin (not shown) is attached onto the first and second excitation coils 9 and 10. As shown in FIG. 15, the excitation and detection coils 9 and 10 are connected in series with each other.

As shown in FIG. 15, a so-called half bridge circuit 11 is formed with the series-connected coils 9 and 10 so that when a pair of triangular wave alternating voltages of, for example, about 30 KHz are applied to both ends denoted by A and B of the half bridge circuit 11 from a triangular wave generator 12 as will be described later, the detection coils 9 and 10 generate magnetic fluxes corresponding to the frequency of 30 KHz and carry out the excitation action from the end of the core member 8 to the magnetostriction shaft 2. In addition, the torque applied to the magnetostriction shaft 2 causes a magnetic resistance (permeability μ) to be varied so that the change in the magnetic flux from the magnetostriction shaft 2 to the core material 8 is detected and a detected voltage corresponding to the change in the magnetic flux is output at a point C. Consequently, a self-inductance (L) of either of the coils 9 and 10 is varied so that a voltage signal at the center tap C is provided indicating the occurrence of the phase mismatch and of the reduction of amplitude of the terminal triangular waveform voltage.

A triangular wave generator 12 generally includes: a) a rectangular wave oscillator 13 (generally constituted by a sinusoidal wave oscillator and flip-flops (shaping circuit) generating a pair of continuous rectangular waveform voltages having the same repetition rate and 180-degree phase difference; b) a triangular wave transform circuit 14 (generally constituted by a pair of integrators and one invertor) which converts the respective rectangular waves from the rectangular wave oscillator 13 into the pair of triangular waveform voltage signals; and c) an operational amplifier (OP) 15 which is so constructed as to amplify a DC reference (bias) voltage VS supplied from a reference voltage generator 24 as will be described later with an amplification factor $\alpha_1$ expressed in an equation (1), the amplified reference voltage being supplied to the rectangular wave oscillator 13 as its bias voltage. A negative feedback resistor 16 is connected between an inverting input end and an output end of the operational amplifier 15. Then, a ground resistor 17 is connected between the inverting input end of the operational amplifier 15 and the ground.

FIGS. 16A and 16B show waveform timing charts of the triangular waveform signals appearing on a point A and a point B of FIG. 15, respectively.

As shown in FIGS. 16A and 16B, the triangular wave generator 12 serves to apply the pair of triangular waveform voltages having phases different from each other by 180 degrees (radian; π) and having approximately equal frequencies f (f=30 KHz) to both ends denoted by A and B of the half bridge circuit 11.

In addition, a detection waveform as a reference waveform signal at a point E is transmitted to a phase detector 23 as will be described later from the rectangular waveform oscillator 13.

The equation (1) described above is expressed as:

$$\alpha_1 = (R1+R2)/R2,$$

wherein R1 denotes a resistance value of the negative feedback resistor 16 and R2 denotes a resistance value of the ground resistor 17.

A center tap C of the half bridge circuit 11 is connected to an inverting amplifier connected to a coupling capacitor 19 to eliminate a DC component from the voltage waveform at the center tap C. The inverting amplifier 18 comprises: a) an operational amplifier 20 having an inverting input end connected to a first fixed resistor 21 and a second fixed resistor 22 whose other end is connected to an output end D of the operational amplifier 20 and a non-inverting input end connected to the reference voltage generator 24 to receive the DC reference voltage thereat.

The inverting amplifier 18 serves to invert and amplify a voltage alternating signal output from the center tap C of the half bridge circuit 11, the amplification factor $\alpha_2$ thereof being expressed in an equation (2) given below:

$$\alpha_2 = -R4/R3,$$

wherein R3 denotes a resistance value of an input resistor 21 and R4 denotes a resistance value of the negative feedback resistor 22.

The phase detector 23 serves to receive: the inverted-and-amplified voltage signal (refer to a waveform at a point D in FIG. 17(B)) from the voltage signal (refer to FIG. 17A) on the center tap C via the capacitor 19 and the inverting amplifier 18; the detection waveform E (refer to FIG. 17C) output from the rectangular wave oscillator 13 of the triangular wave generator 12; and the DC reference voltage VS from the reference voltage generator 24.

As shown in FIGS. 17D and 17E, the phase detector 23 detects (modulates) the voltage signal from the inverting amplifier 18 with reference to the detection waveform E so as to provide positive and negative half-wave rectified signals F and G therefrom.

The reference voltage generator 24 is connected to an adjuster 28 and a differential amplifier 27 so as to constitute a normalization processing circuitry and serves to supply the reference voltage (DC bias voltage VS) to the triangular waveform generator 12 and phase detector 23. The phase detector 23 is generally constituted by two AND gates, one having an invertor input.

First low-pass filter and second low-pass filter (LPF 25 and LPF 26) serve to smooth the positive and negative half-wave rectified signals F and G, respectively, from the phase detector 23 (refer to FIGS. 17D and 17E).

The LPF 25 and LPF 26 are formed, for example, of analog low-pass filters, each filter constituting a capacitor and a resistor in the form of either L type or π type.

As shown in FIGS. 17(F) and 17(G), the positive and negative half-wave separated (modulated) signals output from the phase detector 23 are smoothed to provide the corresponding DC outputs denoted by H and I.

The differential amplifier 27 serves to amplify the difference between the two separate DC outputs H and I passed through the respective LPFs 25 and 26 with the reference voltage derived from the adjuster 28 biased to effect the amplification of the difference voltage so as to provide an output voltage signal J which corresponds to a magnitude and direction of the torque for an external control unit (not shown in FIG. 15). It is noted that the control unit serves to, for example, control the gear shift of the automatic transmission using the final output voltage signal J which is digitally converted therein.

The adjuster 28 is interposed between the reference voltage generator 24 and differential amplifier 27 and includes an operational amplifier 29, a negative feedback fixed resistor 30 connected between the inverting input end of the operational amplifier 29 and the output end of the operational amplifier 29, a ground resistor 31 connected between the inverting input end thereof and the ground, a variable resistor 32 connected to the non-inverting input end thereof for dropping the bias voltage VS from the reference voltage generator 24 so as to adjust the amplification degree of the differential amplifier 27 described above.

The adjuster 28 amplifies the bias voltage VS input via the variable resistor 32 from the reference voltage generator 24 with the amplification factor $\alpha_3$ expressed in the equation (3) and supplies the amplified bias voltage therein to the differential amplifier 27 so that the output signal from the differential amplifier 27 is met with a predetermined standard value (so-called, normalized).

The equation (3) described above is given as:

$$\alpha_3 = (R5+R6)/R6,$$

wherein R5 denotes a resistance value of the negative feedback resistor 30 and R6 denotes a resistance value of the ground resistor 31. The torque is a physical vector quantity.

The operation of the previously proposed torque-electrical transducing apparatus shown in FIGS. 14 and 15 will be described with reference to FIGS. 16 through 18H.

First, when no torque is applied to the magnetostriction shaft 2 (no torque), the pair of triangular waves oscillated with respect to the predetermined DC voltage VO (refer to FIG. 18A and usually the predetermined positive DC voltage is set to be a potential zero) are input with mutually different phases of 180 degrees to both ends A and B of the half bridge circuit 11 from the triangular wave generator 12. However, since no change in each of the permeabilities of both magnetic anisotropic portions 5 and 6 occurs, a tensile stress +σ is acted upon along the first magnetic anisotropic portion 6 so as to increase the permeability μ of the first magnetic anisotropic portion 6 and a compressive stress −σ is acted upon along the second magnetic anisotropic portion 7 so as to decrease the permeability of the second magnetic anisotropic portion 7.

As described above, when the permeability of the first excitation and detection coil 9 is increased, the self inductance L of the coil 9 is accordingly decreased and the applied triangular wave voltage thereacross is increased (it is noted that the phases of the pair of triangular waveform voltages are advanced with respect to the corresponding triangular wave currents according to the changes in the self-inductances) so that the amplitude of one triangular wave voltage applied to the first excitation and detection coil 10 is increased. Therefore, since a balance in voltages between the neutral (center) tap point C and both ends A and B becomes unbalanced, the voltage signal at the center tap C in FIG. 17A generates the smaller triangular voltage signal. This voltage signal is inverted and amplified by means of the inverting amplifier 18 with the predetermined amplification factor $\alpha_2$.

The phase detector 23 detects (modulates) the voltage signal (waveform D in FIG. 17B) from the inverting amplifier 18 with reference to the detection waveform E from the rectangular wave generator 13 shown in FIG. 17C, modulates the inverted-and-amplified voltage signal into the positive and negative half-wave separate (modulated) signals F and G in FIGS. 17D and 17E to be transmitted to the LPFs 25 and 26.

Next, when the half-wave rectified signals F and G output from the phase detector 23 are smoothed with the negative one inverted to provide the DC outputs H and I of the same polarities, as shown in FIGS. 17F and 17G, the differential amplifier 27 subtracts the DC output H of the LPF 25 from the DC output of the LPF 26 and amplifies the difference therebetween so that the final output signal J is normalized and output to the control unit. The amplitude of the final output signal J approximately represents the magnitude and direction of torque applied to the magnetostriction shaft 2 with respect to the bias voltage VS.

It is noted that when a negative torque whose direction is opposite to the arrow-marked direction of T shown in FIG. 14 is applied, the self-inductance L of one of the detection coils 9 is decreased and the self-inductance of the other excitation and detection coil 10 is decreased, the other waveforms of C, D, F, G, H, I, and J except the detection (reference) waveform E are inverted as shown in FIGS. 18A through 18H.

With the chief reference to FIG. 15, the excitation and detection coils 9 and 10 are connected in series with each other to form the half bridge circuit 11 and the pair of triangular waveform signal and its inverted waveform signal are applied to respective ends A and B of the half bridge circuit 11, one of each triangular waveform voltage having different phase to the other by 180 degrees. Therefore, the temperature-dependent characteristic is reduced due to the use of the half-bridge circuit 11 and the pair of triangular waveform voltages and the accuracy of detection of the torque can correspondingly be improved.

Figure 19:
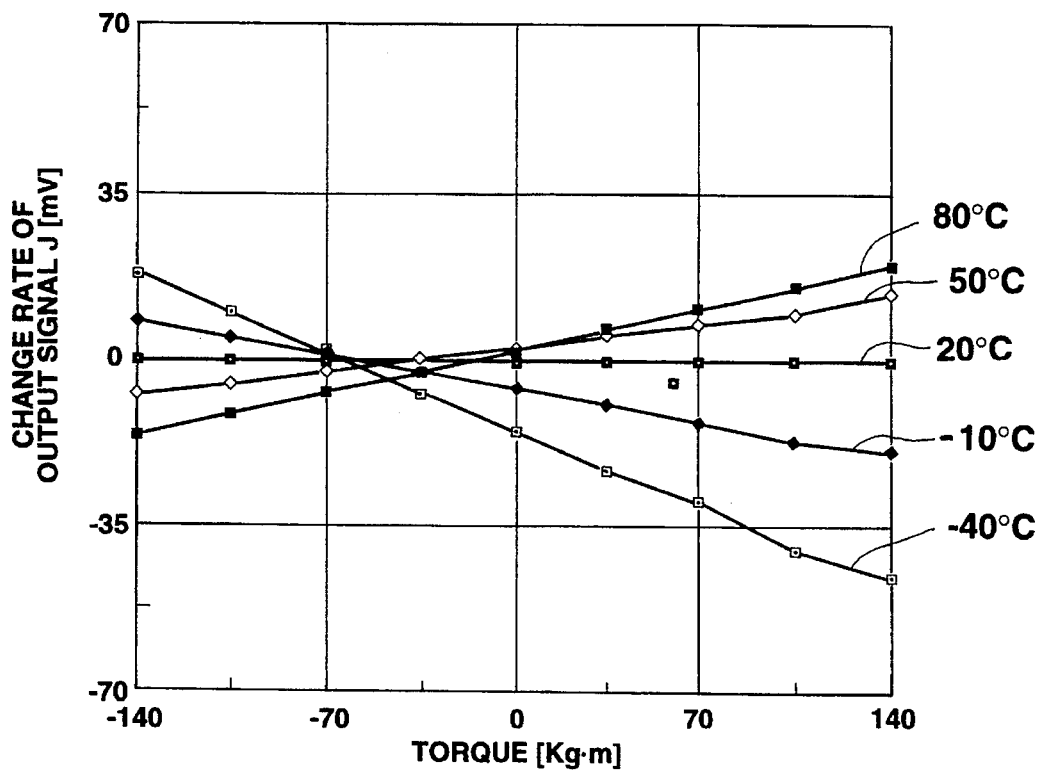
FIG. 19 is a characteristic graph representing results of measurements of change rates of the output voltages in the case of the circuit shown in FIG. 15 with respect to the gradient of the output voltage signal at the normal temperature when temperature changes occur with respect to the reference (normal) temperature of 20° C.

Ambient temperatures on the magnetostriction shaft 2 and excitation and detection coils 9 and 10 vary in a range, for example, from −40° C. to 80° C. according to the application situation of the torque-electrical transducing apparatus so that each of electronic parts has its own inherent temperature-dependent characteristic so that even when, as shown in FIG. 19, the same torque is acted upon the magnetostriction shaft 2 with reference to a normal temperature of 20° C., the inventors have discovered that the voltage value of the output signal J is slightly different according to the ambient temperature of the apparatus.

Figure 20:
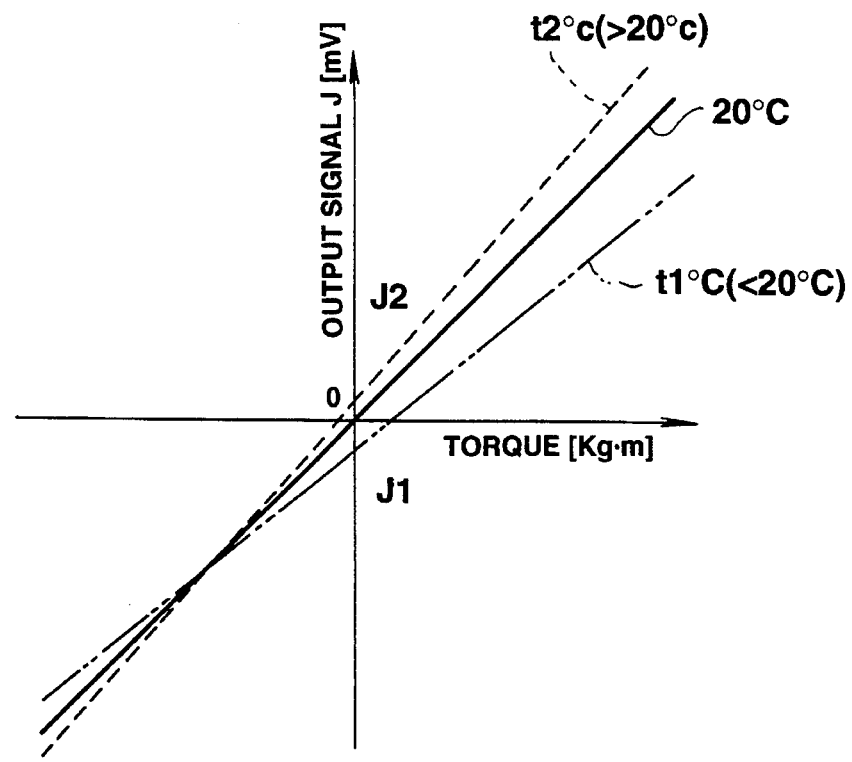
FIG. 20 is a characteristic graph representing the output characteristic gradients in a case where the temperature changes occur with respect to the reference temperature of 20° C. in a case of the previously proposed torque-electrical transducing apparatus shown in FIG. 15.

That is to say, as shown in FIG. 20, with the relationship between the torque at the temperature of 20° C. and the output signal J (output characteristic) as reference and when the temperatures of the excitation and detection coils 9 and 10 are reduced and reach to a temperature of t1° C. such as −40° C., a gradient of the output characteristic becomes reduced (reduction in the torque detection accuracy), a negative leakage voltage J1 apparatus when no torque is applied. On the other hand, the temperatures at the excitation and detection coils 9 and 10 are increased and reach the temperature of t2 such as 80° C., the gradient of the output characteristic becomes large (increase in the torque detection sensitivity) and a positive leakage voltage J2 occurs when no torque is applied.

Thus, the temperature changes in the excitation and detection coils 9 and 10 cause the variation of the output characteristics, i.e., variation in the detection accuracy of the torque occurs and detection accuracy of the torque becomes unstable.

In addition, even when no torque is applied to the magnetostriction sensor 2, the leakage voltages J1 and J2 are generated and a temperature drift of each circuit element occurs.

Next, the various preferred embodiments of the torque corresponding signal generating apparatus and method therefor will be explained with reference to FIGS. 1 through 13 and if the same reference numerals shown in FIGS. 14 through 20 are used in FIGS. 1 through 13, their explanations are omitted herein.

First Embodiment

FIG. 1 through FIG. 4 show a first preferred embodiment of the torque corresponding signal generating apparatus according to the present invention.

In place of the inverting amplifier 18 shown in FIG. 15, the first embodiment uses another type of inverting amplifier 41. That is to say, the other type of inverting amplifier 41 includes the operational amplifier 20, an input temperature-sensitive resistor 42, and a negative feedback resistor 22.

The input temperature-sensitive resistor 42 includes a posistor whose resistance increases as the ambient temperature increases. The posistor is a commercially available product name of a kind of a thermistor having a positive temperature coefficient in which an additive is slightly added to a barium titanate porcelain to provide the semiconductor posistor.

Then, the other type of the inverting amplifier 41 serves to amplify the signal output from the neutral (center tap) point C of the half bridge circuit 11 with the amplification factor of $\alpha_{x1}(=-R4/Rx1 - - - (4))$ so that the gradient of the output characteristic coincides with that at the reference temperature of 20° C.

In the equation (4), Rx1 denotes a resistance value of the input temperature-sensitive resistor 42 and R4 denotes the resistance value of the negative feedback resistor 22.

In addition, in place of the adjuster 28 shown in FIG. 15, another type of adjuster 43 is connected to the differential amplifier 27. The other type of the adjuster 45 includes the variable resistor 32 ground resistor 31, and the negative feedback resistor 44.

The negative feedback resistor 44 includes a thermistor having the negative resistance coefficient such that the resistance value is decreased as the temperature is increased. The adjuster 43 serves to amplify the bias voltage VS input via the variable resistor 32 from the reference voltage generator 24 with the amplification factor $\alpha \times 2$ shown in equation (5) so that if the reference potential at the differential amplifier 27 is adjusted to eliminate the leakage voltage generated in a case of no application of the torque to the magnetostriction shaft 2.

The equation (5) is expressed as:

$$\alpha \times 2 = (Rx2 + R6)/R6 \qquad (5),$$

wherein Rx2 denotes a resistance value of the negative feedback temperature-sensitive resistor 44 and R6 denotes a resistance value of the ground resistor 31.

The other circuit structures are the same as those in the previously proposed torque-electrical transducing apparatus shown in FIG. 15.

The operations of the other types of the inverting amplifier 41 and adjuster 43 will be described below with reference to FIGS. 2 through 4.

First, suppose that the temperature of the inverting amplifier 41 and so forth is reduced exceeding 20° C. of the reference temperature. The resistance value (Rx1) of the input temperature-sensitive resistor 42 constituted by the posistor is decreased and as shown in the equation (4), the amplification factor $\alpha \times 1$ of the inverting amplifier 41 is larger than that at the reference temperature of 20° C. so that the gradient of the output characteristic becomes larger.

On the other hand, suppose that the temperature of the inverting amplifier 41 and so forth is increased exceeding 20° C. of the reference temperature. In this case, the resistance value of the input temperature sensitive resistor 42 is also increased so that the amplification factor $\alpha \times 1$ becomes lower than that at the reference temperature of 20° C. and the gradient of the output characteristic becomes lower.

Figure 2:
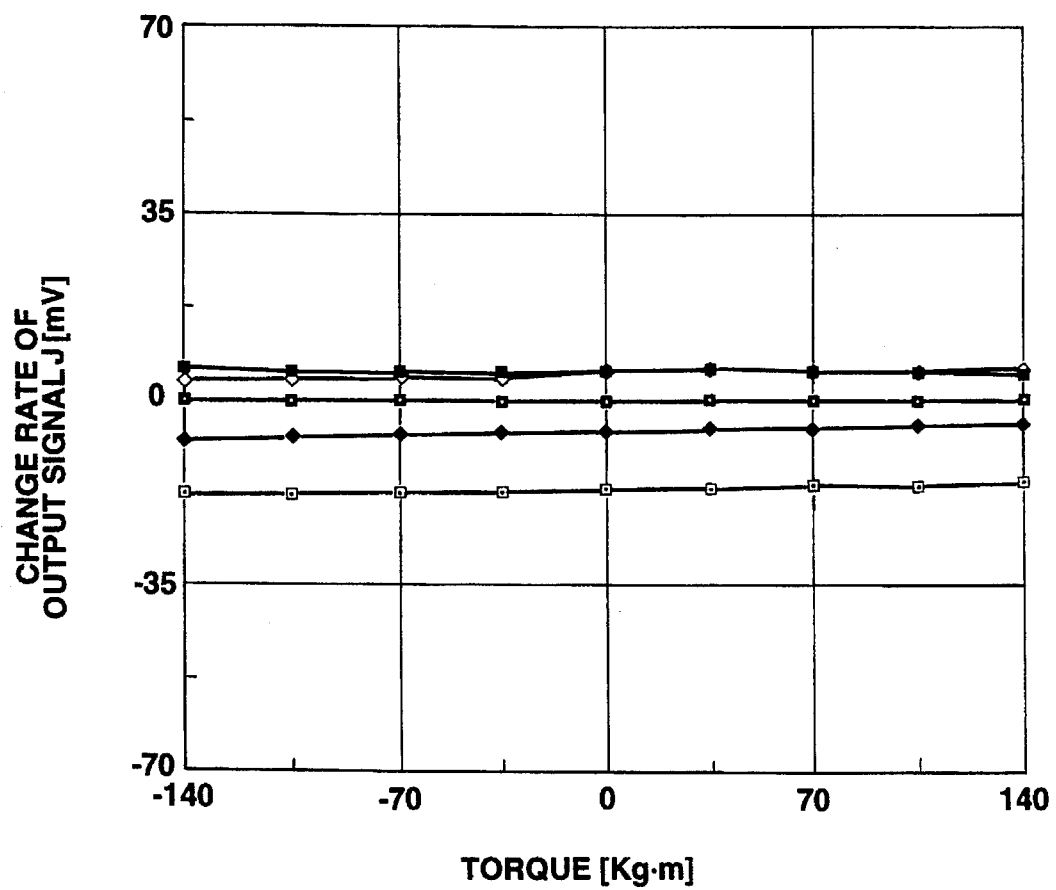
FIG. 2 is a characteristic graph representing a measurement result of a change rate with respect to an output torque signal at a reference (normal) temperature of 20° C. in a case where temperature changes with respect to the normal temperature are given to an input resistor of an amplifier (inverting amplifier) shown in FIG. 1, the input resistor being a posistor.
Figure 3:
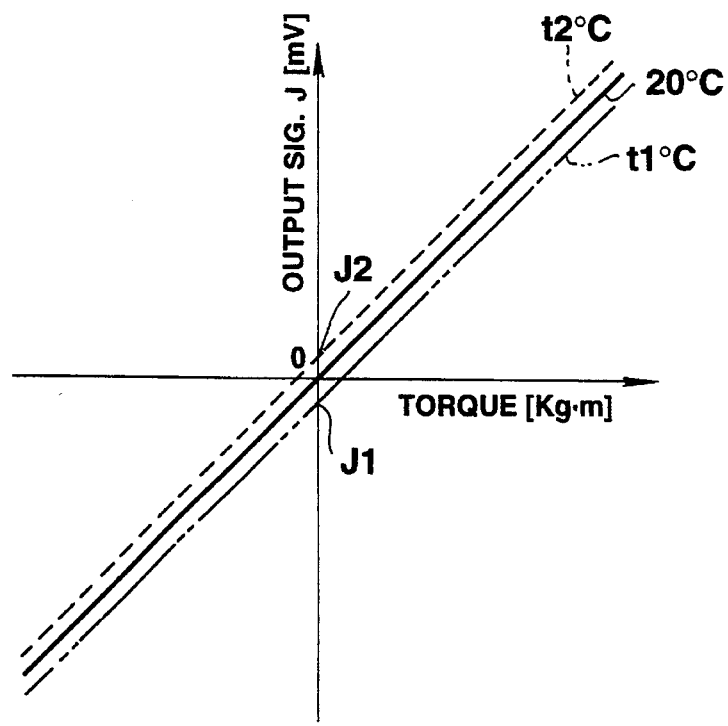
FIG. 3 is an output characteristic diagram when a gradient of the output characteristic (final output signal J) is coincident with that at the reference (normal) temperature of 20° C. due to a change in an amplification factor of the (inverting) amplifier shown in FIG. 1.

Thus, since, referring to FIGS. 2 and 3, the other type of the inverting amplifier 41 automatically adjusts the amplification factor $\alpha \times 1$ in response to the temperature change even when the temperature is varied with respect to the reference temperature of 20° C., the gradient of the output characteristic becomes approximately the same as that at the reference (normal) temperature of 20° C.

Next, the negative temperature-dependent thermistor is used in the negative feedback temperature sensitive resistor 44 of the adjuster 43. Thus, in a case where the temperature at the adjuster 43 is reduced below the reference temperature of 20° C., the resistance value (Rx2) of the negative feedback resistor 44 is increased and tile amplification factor $\alpha \times 2$ becomes large as expressed in the equation (5). Thus, the value of the bias voltage VS supplied to the differential amplifier 27 is larger than that at the reference temperature of 20° C. and the potential at the leakage voltage J1 shown in FIG. 3 is raised to approach to zero.

Furthermore, in a case where the temperature at the adjuster 43 is increased and exceeds the reference temperature of 20° C., the resistance value of the negative feedback resistor 44 is reduced and the amplification factor $\alpha \times 2$ is also reduced. Thus, since the value of the bias voltage VS to be supplied to the differential amplifier 27 becomes lower than that at the reference temperature of 20° C., the potential at the leakage voltage J2 shown in FIG. 3 is reduced so as to approach to zero.

Figure 4:
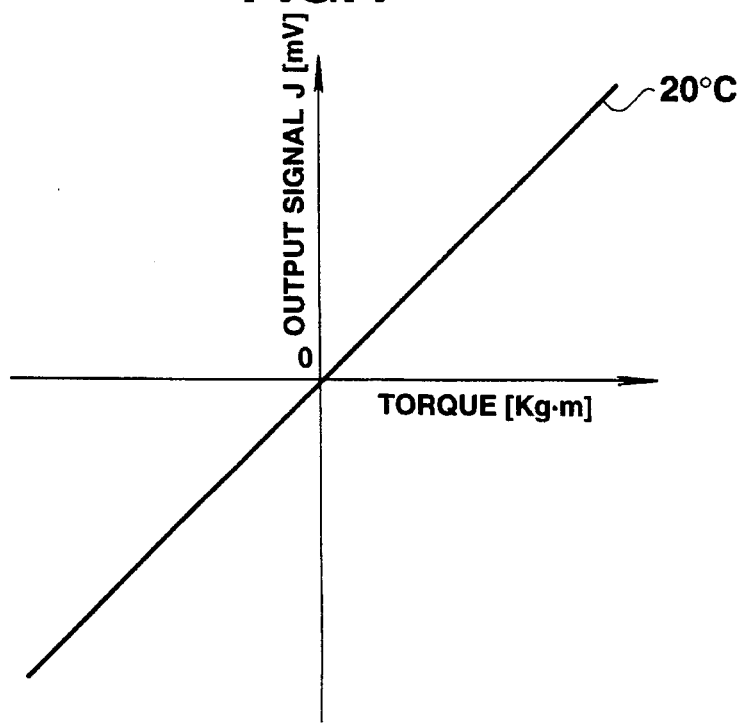
FIG. 4 is an output characteristic graph of J when a leakage voltage (leakage voltage when no torque is applied as zero) in FIG. 3 is eliminated due to the change in the amplification factor of an adjuster.

In this way, as shown in FIG. 4, when the temperature change occurs with respect to the reference temperature of 20° C., the adjuster 43 automatically adjusts its amplification factor $\alpha \times 2$ so that a magnitude of the bias voltage VS supplied to the differential amplifier 27 is adjusted so that the leakage voltages J1 and J2 are approached to zero.

In the first embodiment, if the temperatures of the excitation and detection coils 9 and 10, inverting amplifier 41, and adjuster 43 are varied with respect to the reference temperature of 20° C., the amplification factor $\alpha \times 1$ is automatically adjusted by means of the inverting amplifier 41 so that the gradient of the output characteristic can be approached approximately to that at the reference temperature of 20° C.

The adjuster 43 automatically adjusts the amplification factor α×2 so as to automatically adjust the bias voltage VS supplied to the differential amplifier 27. Consequently, the leakage voltages J1 and J2 during no application of the torque can approximately be zeroed.

Furthermore, even if the temperatures of the excitation and detection coils 9 and 10 are varied with respect to the reference temperature of 20° C., the output characteristic during the temperature variation is automatically adjusted so as to approximately coincide with the output characteristic at the reference temperature of 20° C. Therefore, the variation in the detection sensitivity of the torque can be prevented and the accuracy of detection of the torque can effectively be stabilized. Thus, the error due to the generation of the temperature drift can be prevented, the detection accuracy and reliability can remarkably be improved.

In addition, since the posistor and thermistor are used in the input temperature sensitive resistor 42 of the inverting amplifier 41 and in the negative feedback temperature-sensitive resistor 44 of the adjuster 43, the accuracy, stability, and reliability of the torque corresponding signal generating apparatus can be assured.

Second Embodiment

The feature of the second embodiment of the torque corresponding signal generating apparatus according to the present invention is that as a negative feedback resistor 52 in the triangular wave generator 51, a thermistor is used whose resistance value is reduced as the temperature rises. The other circuit structures are the same as those in the first embodiment shown in FIG. 1.

Figure 5:
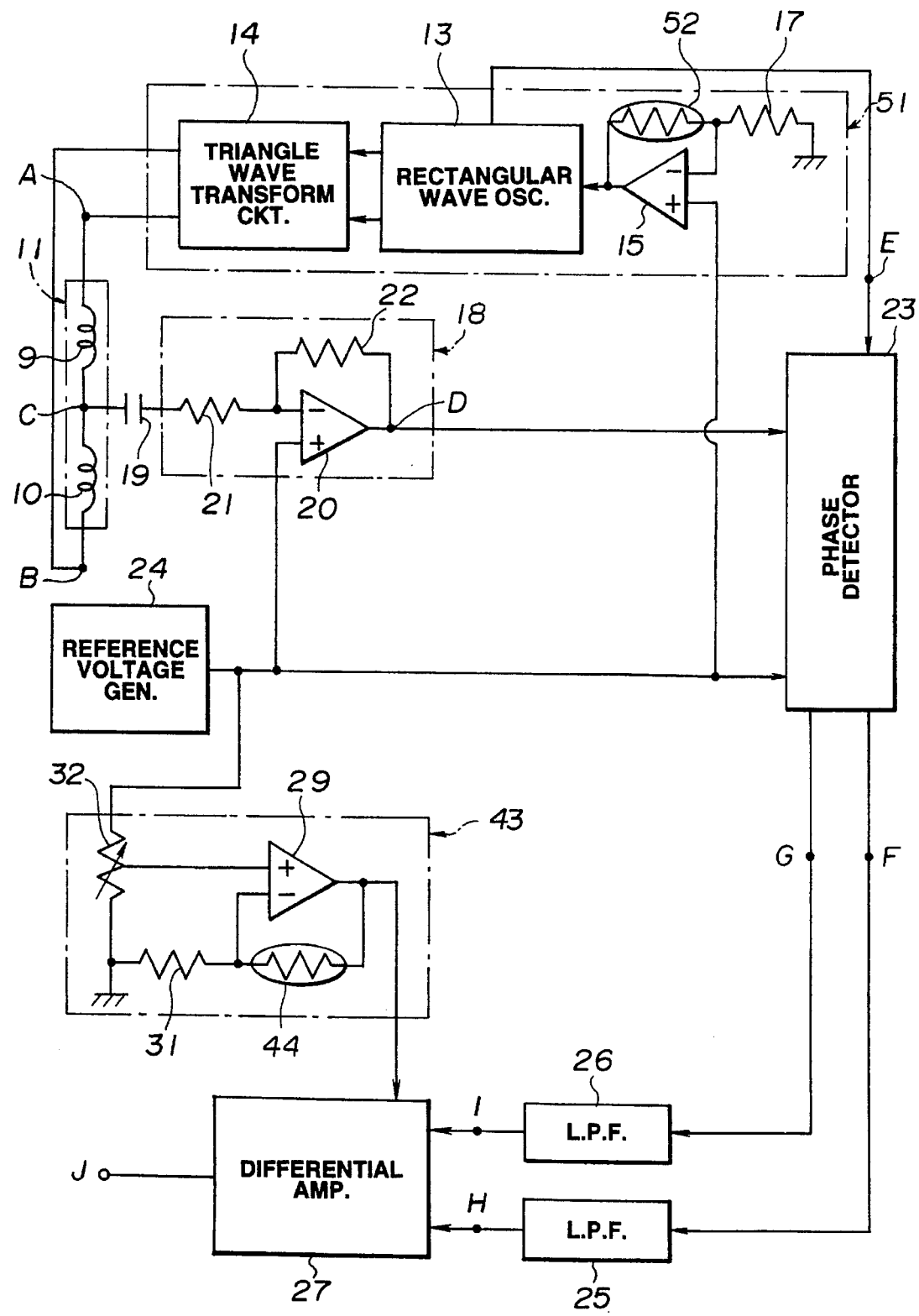
FIG. 5 is a schematic circuit block diagram of the torque corresponding signal generating apparatus in a second preferred embodiment according to the present invention.

FIG. 5 shows the circuit block diagram of the torque corresponding signal generating circuit in the second preferred embodiment according to the present invention.

As shown in FIG. 5, the waveform wave generator 51 includes the rectangular wave generator 13, the triangular wave transform circuit, the operational amplifier 15, the negative feedback resistor 52, and the ground resistor 17. It is noted that the triangular waveform transform circuit 14 may be constituted by miller integrators and one invertor. As shown in FIG. 5, the rectangular waveform generator 51 has the negative feedback resistor 52 of the thermistor as the temperature-sensitive resister. The triangular waveform generator 51 varies the amplification factor α×3 (as shown in equation (6)) in accordance with the equation (6).

The equation (6) is given as:

$$\alpha \times 3 = (R \times 3 + R2)/R2,$$

wherein R×3 denotes the resistance value of the negative feedback temperature sensitive resistor 52 and R2 denotes the resistance value of the ground resistor 17.

In the second embodiment, when the temperatures at the triangular waveform generators 51 and so forth are reduced below the reference temperature of 20° C., the resistance value of the negative feedback resistor 52 is increased so that the amplification factor α×3 of the triangular waveform generator 51 is increased. Thus, each amplitude of the triangular waves applied to both ends of A and B of the half bridge circuit 11 via the triangular wave transform circuit 14 becomes larger than those at the reference temperature of 20° C. so that the signal level at the center tap C of the half bridge circuit 11 is increased. Consequently, the gradient of the output characteristic becomes larger so that the gradient thereof approaches to that at the reference temperature of 20° C.

On the other hand, if the temperatures at the triangular waveform generator 51 and so forth are increased and exceed the reference temperature of 20° C., the resistance value of the negative feedback temperature sensitive resistor 52 is decreased and the amplification factor α×3 of the triangular waveform generator 51 is decreased. The amplitudes of the triangular waves applied to the half bridge circuit 11 become reduced exceeding those at the reference temperature of 20° C., the signal level of the center tap point C is decreased.

Consequently, the gradient of the output characteristic is reduced and approaches to that at the reference temperature of 20° C.

Third Embodiment

The feature of the third preferred embodiment of the torque corresponding signal generating apparatus according to the present invention is that an invertor 61 is connected between the inverting amplifier 41 and phase detector 23. The other circuit structures are the same as those in the first embodiment described above.

The invertor 61 includes a resistor connected to the output end of the inverting amplifier 41 and the inverting input end of an operational amplifier 62, another negative feedback resistor 64 connected between the inverting input end of the operational amplifier 62 and the output end thereof 62, the resistance value of the resistor 63 being equal in resistance value to the negative feedback resistor 64 so that the amplification factor of the invertor gives −1. The non-inverting input end of the operational amplifier 62 is connected to the reference voltage generator 24. The output end of the invertor 62 is connected to the phase detector 23 so as to provide the inverted voltage signal (D') of the output voltage signal (D) of the inverting amplifier 41 for the phase detector 23.

FIGS. 7A through 8I show each output waveform at points of C through J' in the third embodiment of the torque corresponding signal generating apparatus.

In the third embodiment, the output signal J' is larger in amplitude than the output signals J of the first and second embodiment according to the present invention.

When the torque is applied to the arrow-marked direction T shown in FIG. 14, the balance of the voltage at the center tap point C of the half bridge circuit 11 is lost so that the voltage signal denoted by FIG. 7A is generated. The voltage signal at the point of D in FIG. 7B is inverted and amplified with the predetermined amplification factor α×1 by means of the inverting amplifier 41, the waveform of the point D shown in FIG. 7B being input to the phase detector 23 and the inverted waveform of the point D' shown in FIG. 7C being input to the phase detector 23, respectively.

The phase detector 23 detects the phases of the voltage signals (waveforms of D and D') from the inverting amplifier 41 and the invertor 61 with the detected waveform of E from the rectangular wave oscillator 13 as shown in FIG. 7D as the reference waveform, the voltage signals of D and D' being converted to the positive and negative full-wave rectified signals F' and. G' to provide them for the LPF 25 and LPF 26.

Next, when the LPFs 25 and 26 are converted into the DC outputs H' and I' with the full-wave rectified signals F' and G' output from the phase detector 23, as shown in FIGS. 7E and 7F, the differential amplifier 27 subtracts the DC output H' of the LPF 25 from the DC output I' of the LPF 26 so that its difference is amplified to output the final output J' to the control unit (not shown). The final output J' provides the signal output from the phase detector 23 for the full-wave rectified signal and the output signal J' can be enlarged and the detection accuracy can be improved.

On the other hand, if the negative torque is applied to the direction opposite to the arrow-marked direction T shown in FIG. 14, the self inductance of the first excitation and detection coil 9 is reduced and the second excitation and detection coil 10 is increased, the other waveforms of C, D, D', F', G', H', I', and J' are inverted except the waveform of E as shown in FIGS. 8A through 8I.

It is noted that the output signal of J' from the differential amplifier 27 provides the positive DC voltage when the torque is applied to the direction of T shown in FIG. 14.

Fourth Embodiment

Figure 6:
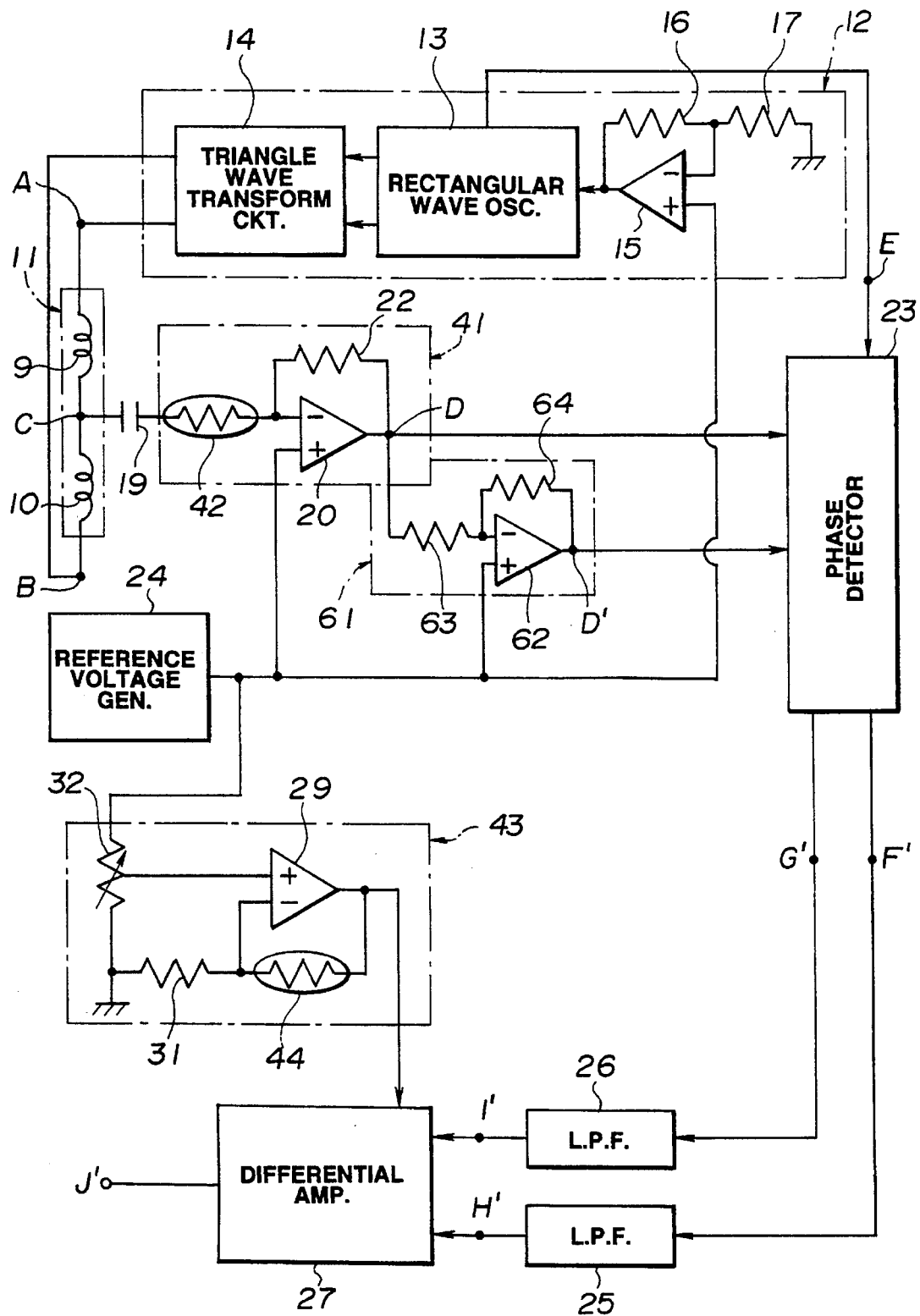
FIG. 6 is a schematic circuit block diagram of the torque corresponding signal generating apparatus in a third preferred embodiment according to the present invention.
Figure 7:
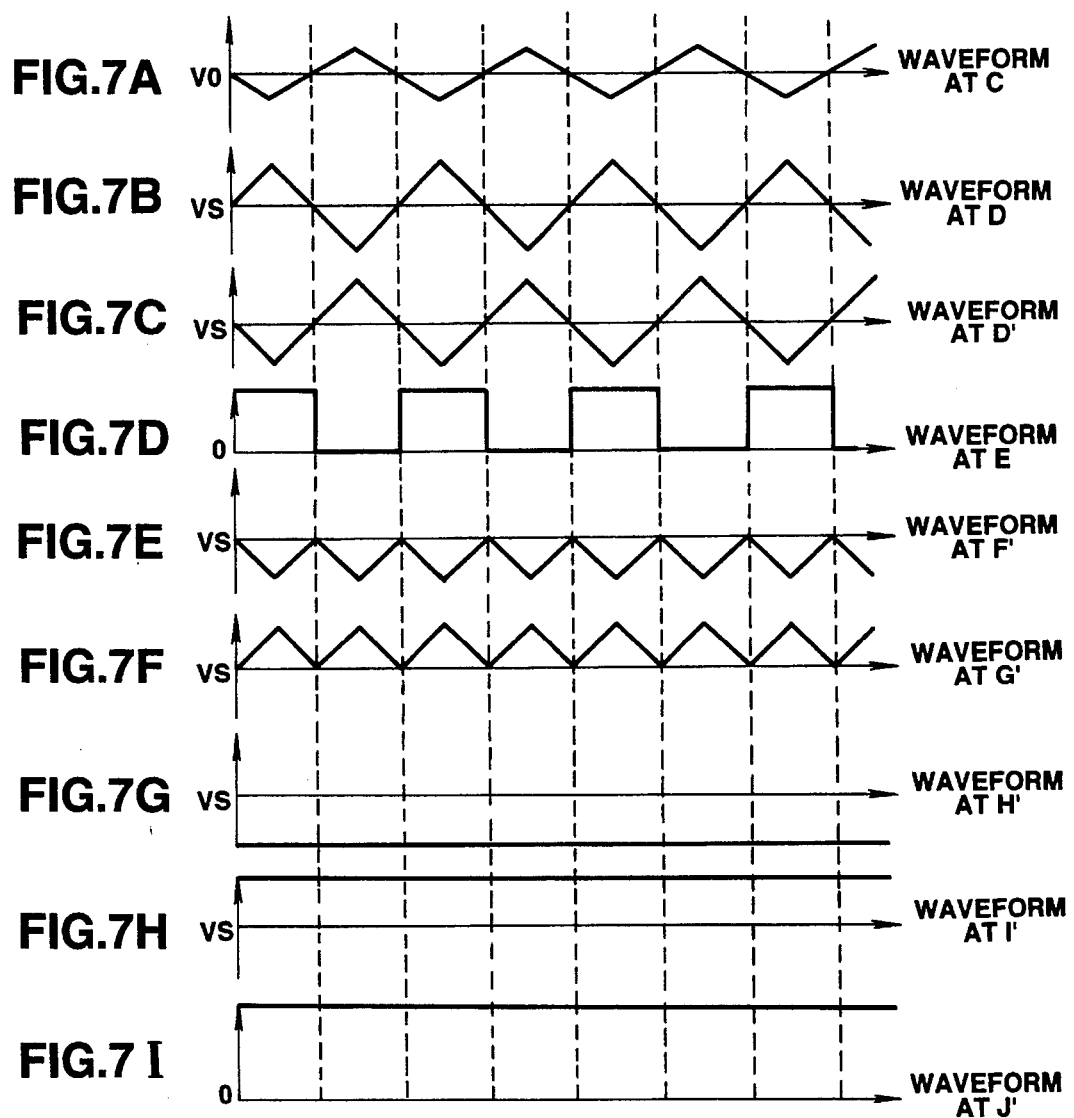
FIGS. 7A through 7I are integrally a waveform timing flowchart representing a waveform generated and output in each circuit shown in FIG. 6 when a positive torque is applied to a magnetostriction shaft in an arrow-marked direction of T in FIG. 14.
Figure 8:
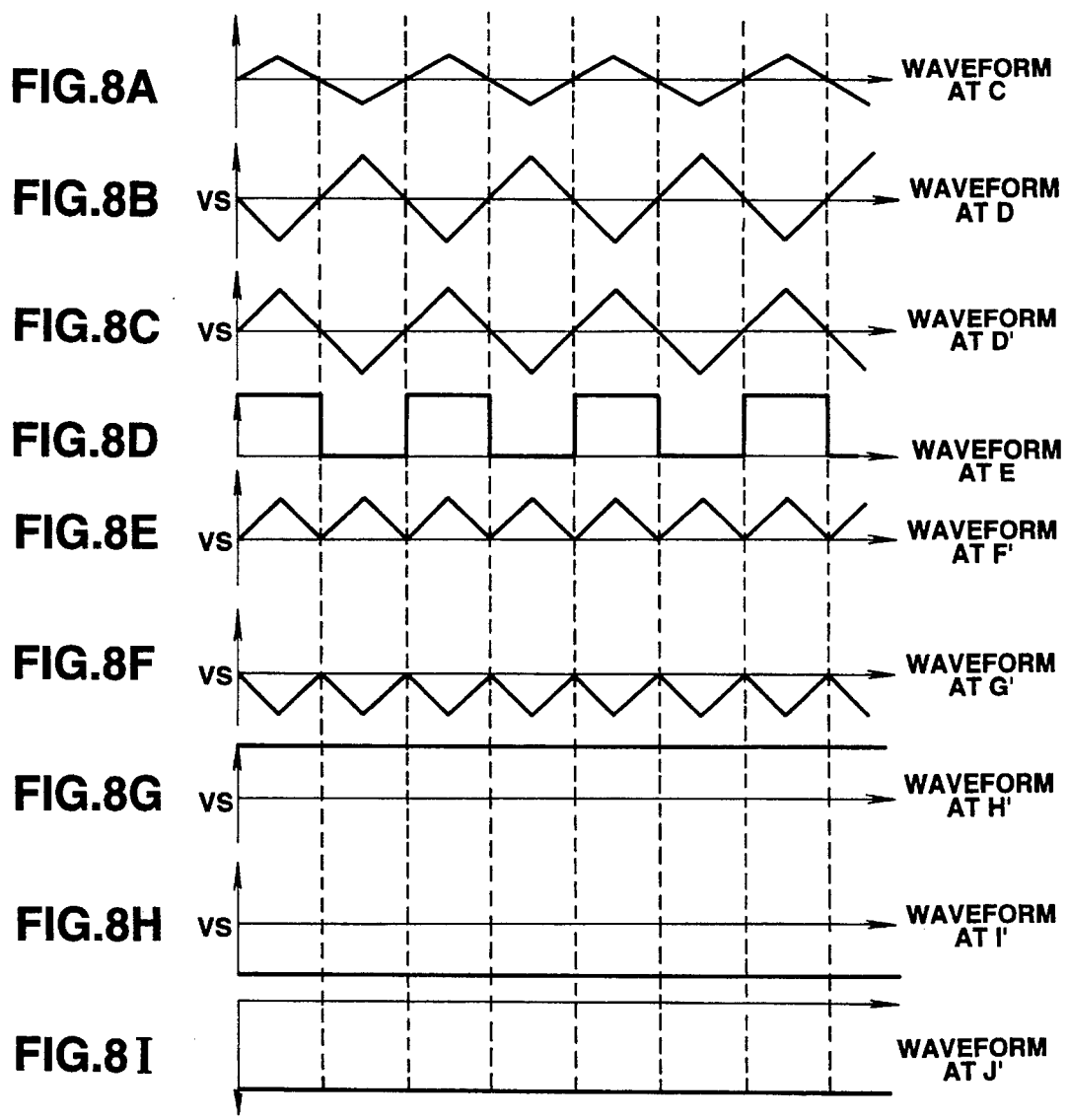
FIGS. 8A through 8I are integrally a waveform chart representing a waveform generated and output in each circuit shown in FIG. 6 when a negative torque is applied to the magnetostriction shaft in a direction opposite to the arrow-marked direction of T in FIG. 14.

The feature in the fourth embodiment is that in place of the triangular waveform generator 12 shown in FIG. 6, the triangular waveform generator 51 having the input temperature-sensitive resistor in the case of the second embodiment shown in FIG. 5 is used and the inverting amplifier 41 shown in FIG. 6 is the inverting amplifier 18 shown in FIG. 15.

Figure 9:
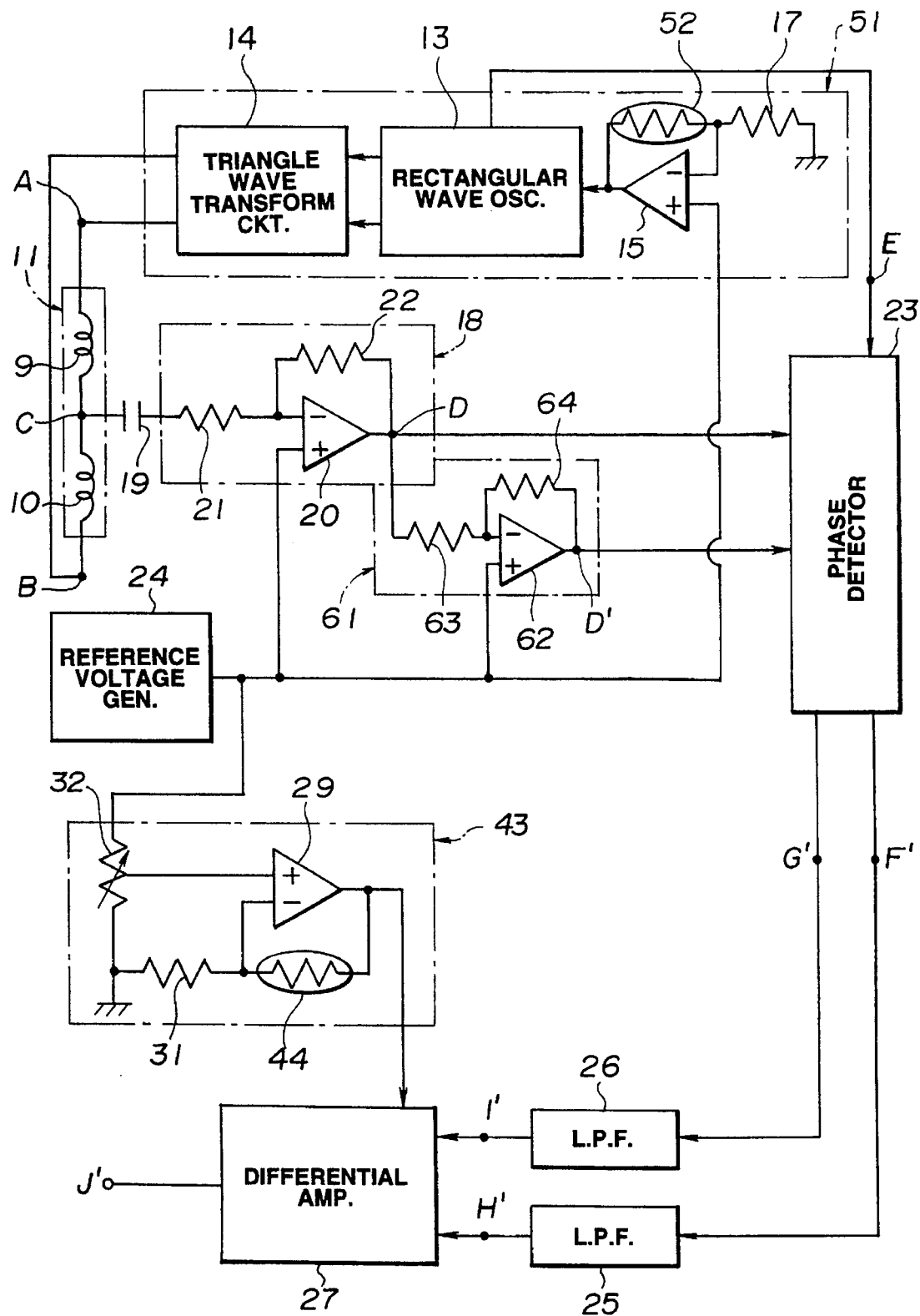
FIG. 9 is a schematic circuit block diagram of a fourth preferred embodiment of the torque corresponding signal generating apparatus according to the present invention.

FIG. 9 shows the torque corresponding signal generating apparatus in the fourth embodiment according to the present invention.

Since, in the fourth embodiment, the signals derived from the phase detector 23 are full-wave rectified so that the output signal can be enlarged and detection accuracy can be improved.

The other circuit structures are the same as those described with reference to FIG. 6.

In each embodiment, although the thermistor is used for the negative feedback temperature sensitive resistor 44 within the adjuster 43 and bias voltage VS is adjusted to be supplied to the differential amplifier 27 so as to eliminate the leakage voltage during no application of torque, the adjuster 28 described in the previously proposed torque-electrical transducing apparatus shown in FIG. 15 may alternatively be used since no influence of the leakage voltage on the practical application of the torque measurement.

Fifth Embodiment

The feature of the fifth embodiment is that, in place of the triangular waveform generator 12 described with reference to FIG. 15, a new triangular waveform generator 71 is used in the torque corresponding signal generating apparatus.

Figure 1:
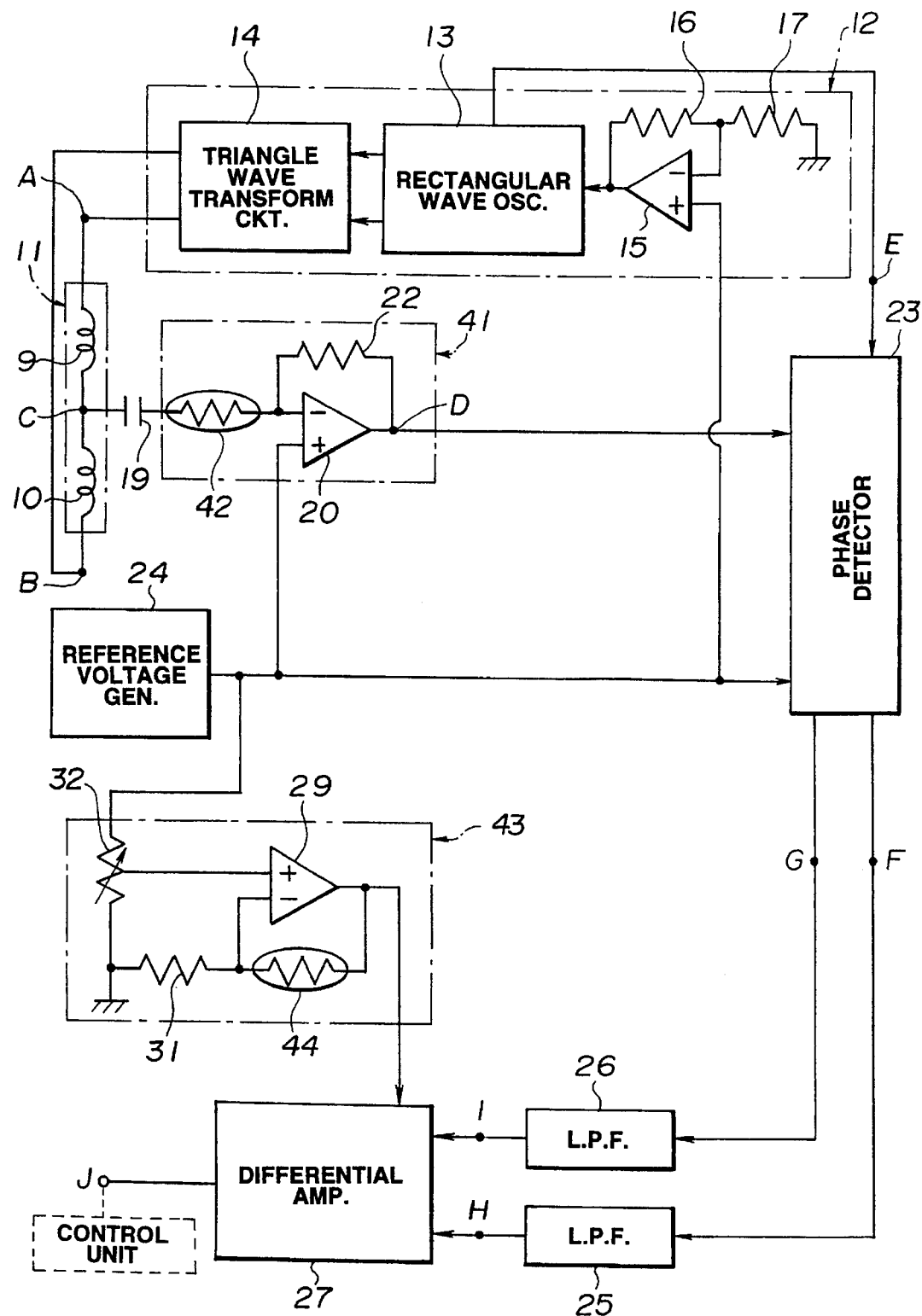
FIG. 1 is a schematic circuit block diagram of a torque corresponding signal generating apparatus in a first preferred embodiment according to the present invention.

The other circuit structures are the same as those in the first embodiment shown in FIG. 1.

Figure 10:
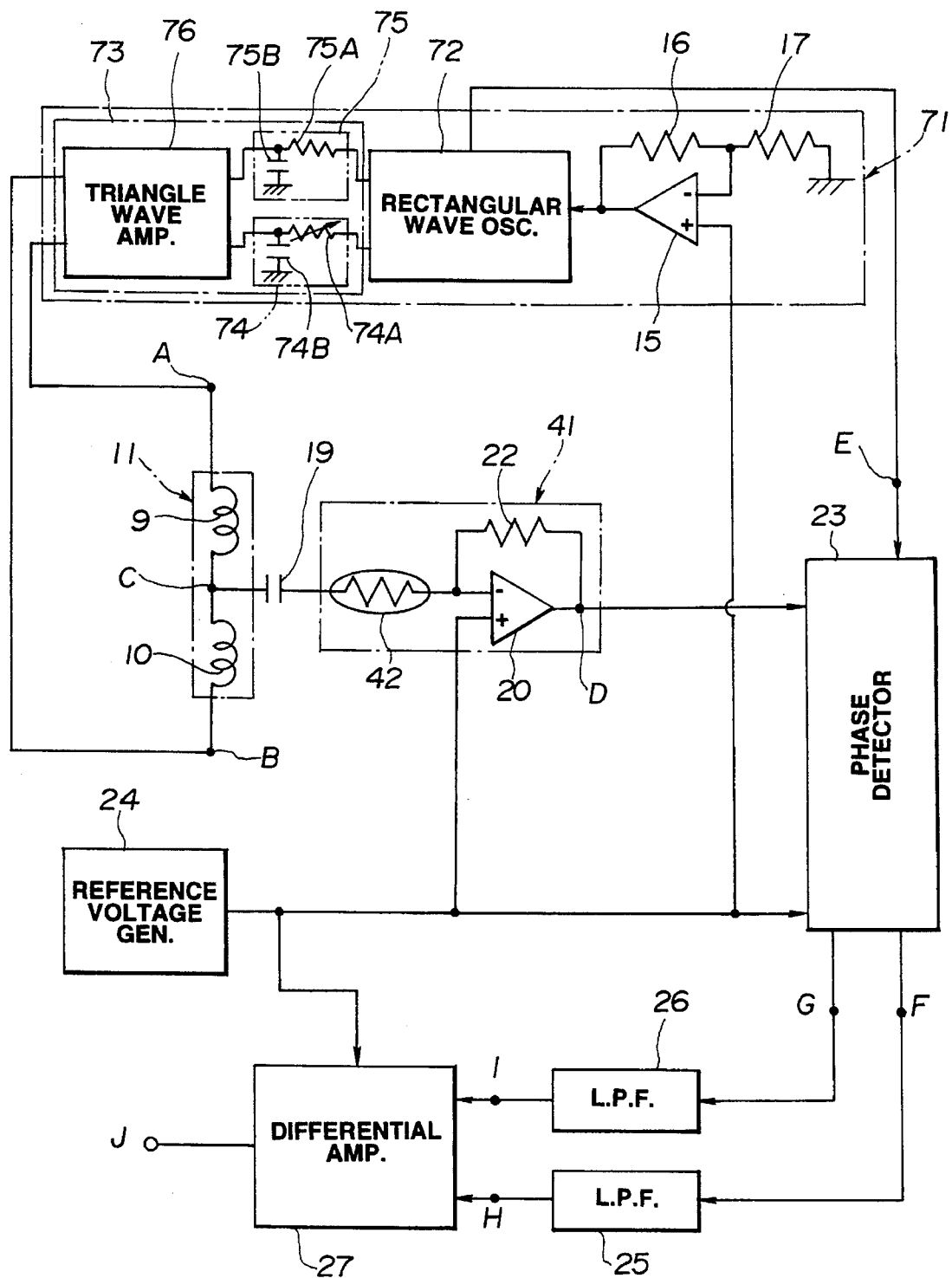
FIG. 10 is a schematic circuit block diagram of a fifth preferred embodiment of the torque corresponding signal generating apparatus according to the present invention.
Figure 11:
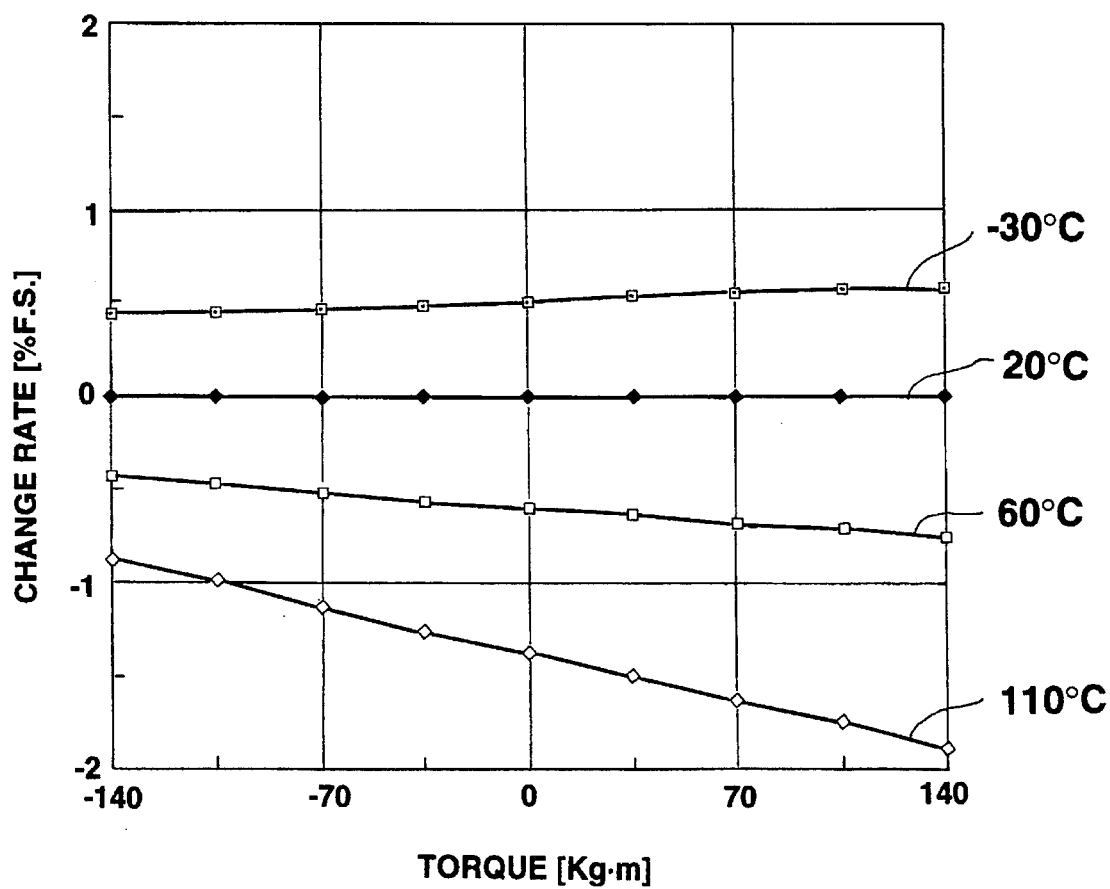
FIG. 11 is a characteristic graph representing results of measurements of the output voltages J with respect to the reference (normal) temperature 20° C. the result of measurement being corrected according to changes in the amplification factors of the inverting amplifier and adjuster of the torque corresponding signal generating apparatus according to the present invention, respectively.
Figure 12:
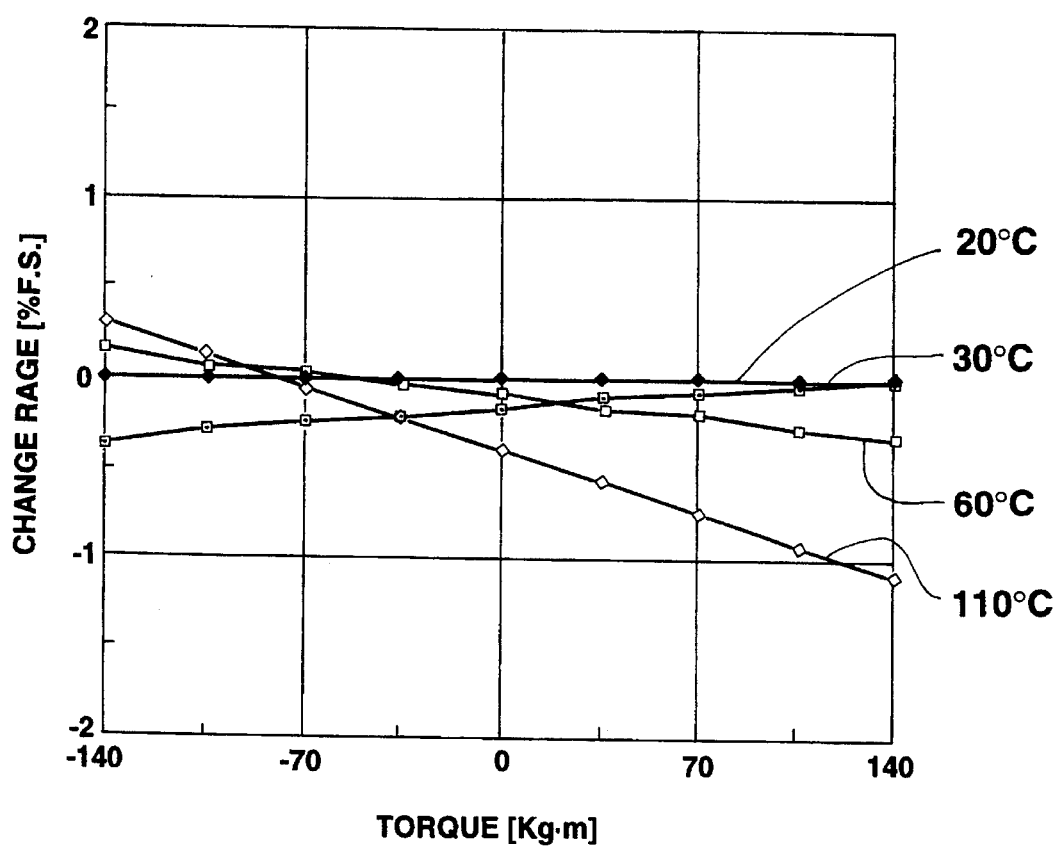
FIG. 12 is a characteristic graph representing results of the change rates of the output voltages J with respect to reference (normal) temperature of 20° C. corrected by adjusting at least one of amplitudes of a pair of triangular waveform voltages applied to both ends of a half bridge circuit equivalent to a pair of excitation and detection coils shown in FIG. 14.

FIGS. 10 through 12 show the fifth preferred embodiment of the torque corresponding signal generating apparatus according to the present invention.

The triangular waveform generator 71, in the fifth embodiment, includes: the rectangular waveform oscillator 72 having the phases mutually different by 180 degrees and having the frequencies of, for example, 30 KHz in the same way as described with reference to FIG. 15; and triangular wave transform circuit 73 which transforms the two separate rectangular waves into the corresponding two triangular waveforms.

The triangular waveform transform circuit 73 includes a pair of integrators 74 and 75 connected to the output ends of the rectangular wave generator 72.

Each integrator 74 and 75, in the fifth embodiment, comprises an integrating resistor 74A and 75A and integrating capacitor 74B and 75B in the shape of letter L and their time constants $\tau 1$ and $\tau 2$ are set as follows: equation (7); $\tau 1 = Ra \times Ca$, $\tau 2 = Rb \times Cb$, wherein Ra denotes a resistance value of the integrating resistor 74A, Ca denotes an electrostatic capacitance of the integrating capacitor 74B, Rb denotes a resistance value of the integrating resistor 75A, and Cb denotes an electrostatic capacitance of integrating capacitor 75B.

In the fifth embodiment of the torque corresponding signal generating apparatus, even if the temperature is raised exceeding the reference temperature of 20° C., the temperature compensation is carried out by means of the input temperature-sensitive resistor 42 of the inverting amplifier 41 so that the amplification factor $\alpha \times 1$ of the inverting amplifier 41 can be reduced and the gradient of the output characteristic can automatically compensated for.

On the other hand, in the first, second, third, and fourth embodiments, impedances of both of the excitation and detection coils 9 and 10 are slightly different due to the imbalances in the magnetic layers of the magnetostriction shaft 2 and excitation and detection coils 9 and 10. Therefore, a slight output error occurs even during no application of torque from the center tap C of the half bridge circuit 11. This slight output error can be eliminated by the adjustment in the adjuster 43 so as to provide the final output signal J for zero. Thus, the correction of the error can be carried out. However, if the temperature changes, a slight deviation occurs in the characteristic of the magnetostriction shaft's permeability according to the change in the temperature as shown in FIG. 11.

However, in the fifth embodiment, the one integrating resistor 74A includes a variable resistor of the one integrator 74 from among the integrators 74 and 75 of the triangular wave transform circuit 73. If the variable resistor 74A is manually adjusted, the time constant $\tau 1$ is varied so that an amplitude (peak value) of one of the two triangular waveforms is adjusted.

Hence, even when the impedances of the excitation and detection coils 9 and 10 are different, the peak value of the one triangular wave is adjusted so that the impedances of the excitation and detection coils 9 and 10 become deceptively uniform and the output signal from the center tap C of the half bridge circuit 11 can completely be zeroed during no application of torque.

As described above, the time constant $\tau 1$ of the integrator 74 is manually adjusted during no application of torque so that the impedances of both excitation and detection coils 9 and 10 are corrected and so that the signal derived from the center tap C of the respective excitation and detection coils 9 and 10 can be set to zero.

Consequently, the slight deviations of the permeabilities due to the change in temperature can be corrected as shown in FIG. 12. The determination of torque with higher accuracy that those in the first, second, third, and fourth embodiments can be achieved.

Furthermore, since the output signal J during no application of torque can be set to zero, either the adjuster 43 or 28 can be omitted and the number of parts to be used can remarkably be reduced.

Sixth Embodiment

Figure 13:
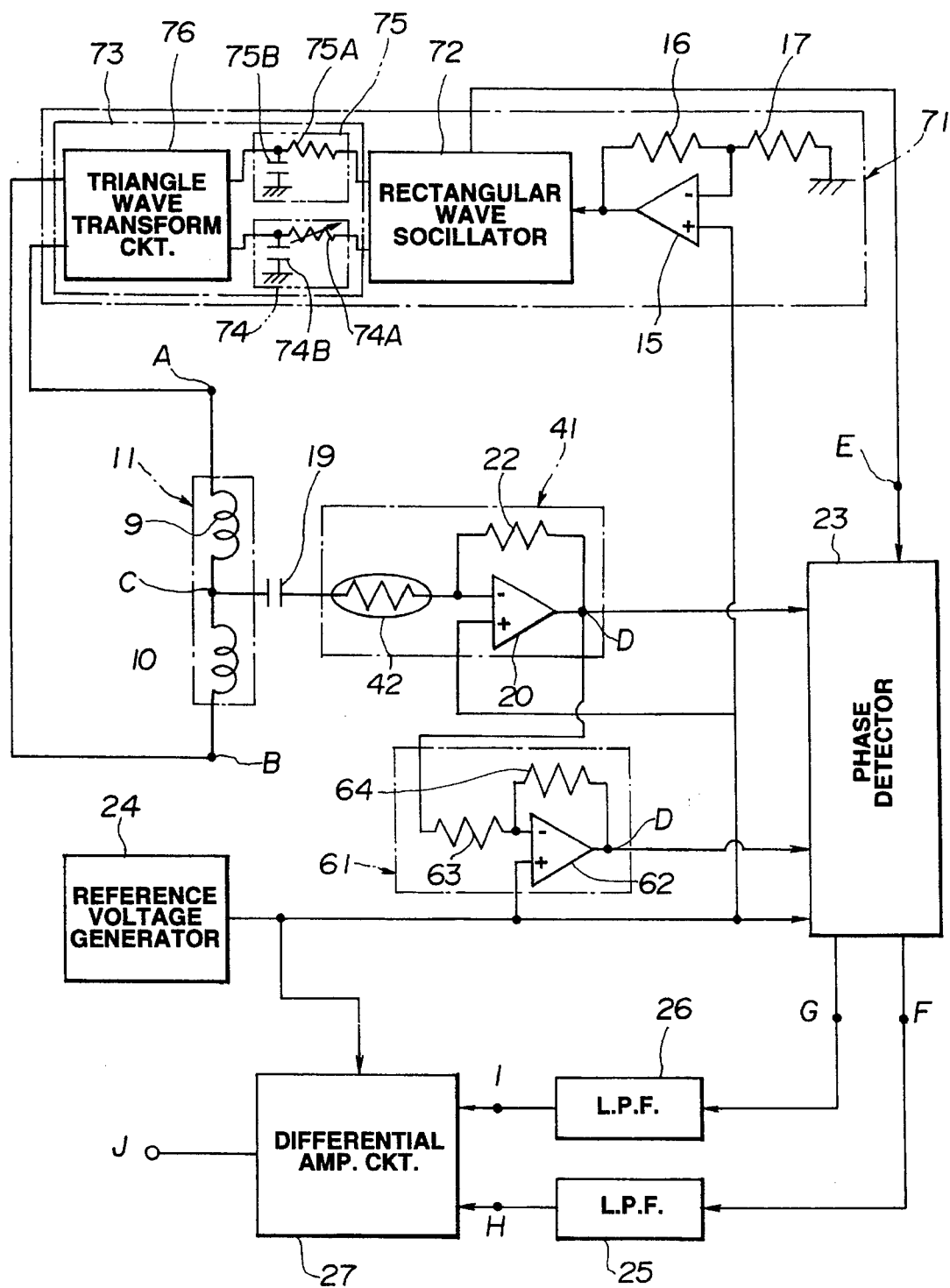
FIG. 13 is a schematic circuit block diagram of the torque corresponding signal generating apparatus apparatus in a sixth preferred embodiment according to the present invention.

FIG. 13 shows the sixth preferred embodiment of the torque corresponding signal generating apparatus.

The structures of the circuits are almost the same as those in the fifth embodiment shown in FIG. 10.

However, in the sixth embodiment, the triangular waveform generator 71 is used in place of the triangular waveform generator shown in FIG. 15 and the invertor 61 is connected at the subsequent stage after the inverting amplifier 41.

In the sixth embodiment, the variation in the characteristic of the permeabilities of the coils due to the change in the temperature can be prevented with the adjuster of either 43 or 28 omitted in the same way as in the fifth embodiment. If the signal output from the phase detector 23 is the full-wave rectified signals so that the magnitude of the final output signal can be enlarged and sensitivity of determination of torque can remarkably be improved.

It is noted that although, in the first, third, fifth, and sixth preferred embodiments, the amplification factor adjusting means is constituted by the posistor as the input temperature-sensitive resistor 42 of the inverting amplifier 41, the negative feedback resistor 22 of the inverting amplifier 41 may alternatively be constituted by the thermistor.

It is also noted that although in each embodiment each magnetic anisotropic portion 6 and 7 is formed of the magnetic materials, the whole magnetostriction shaft 2 may be formed of the magnetic material.

It is furthermore noted that although both of LPFs 25 and 26 are used to make the half or full wave rectified signals from the phase detector 23 in the DC form and to achieve the output signal through the differential amplifier 27, for example, the LPFs are used to smooth the full-wave rectified signals derived from the other type of the differential amplifier and which were converted from the half-wave rectified signals from the phase detector 23 or, in place of the LPFs, A/D converter may be used.

In each embodiment, although the torque corresponding signal generating apparatus is applicable to the measurement of the torque applied to the output shaft of the vehicle mounted engine, the present invention is applicable to, for example, the output torque measurement of an electric motor and/or a generator.

It is furthermore noted that although, in the fifth and sixth embodiments, the amplitudes of the triangular waveforms (peak values) are adjusted using the variable resistor as the integrating resistor of the one integrating circuit 74, the integrating capacitor 74B may be variable or alternatively either of the integrating resistor 75A or the integrating capacitor 75B may be adjustable.

Furthermore, although, in the fifth and sixth embodiments, the correction of the output signal during no application of torque is made on the basis of the signal derived from the center tap C of the half bridge circuit 11, the final output signal may be corrected.

The term of alternating is used for all waves described in the specification and means that the continuous signal crosses the potential zero as shown in FIG. 7A.

As described hereinabove, in the torque corresponding signal generating apparatus according to the present invention, the amplification factor of the amplifier is adjusted according to the change in the ambient temperature of the circuit elements so that the amplification factor of the signal generated on the center point of each detection coil is adjusted, the gradient of the output characteristic of the output signal from the processing circuitry can be adjusted according to the change in the temperature, the detection accuracy of torque can be stabilized, and its reliability and its accuracy of detection can be improved.

It is finally noted that each of the first, second, third, fourth, fifth, and/or sixth embodiments can be combined together.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus comprising:

a) sensing means having a magnetostrictive shaft portion and a pair of coil portions, said shaft portion axially interposed between each end of a rotatable shaft and said pair of coil portions constituting a series-connected half bridge circuit, each coil portion having a self inductance which varies in accordance with a magnitude and direction of a torque applied to said shaft portion;

b) triangular waveform generating means for generating a pair of triangular waveform alternating signals having phases mutually different from one another by approximately 180 degrees and having the approximately same frequencies and for applying the pair of triangular waveform alternating signals to both ends of the half bridge circuit so that a center tap of said half bridge circuit provides no signal when no torque is applied to the shaft portion of the sensing means via said rotatable shaft;

c) phase detecting means for detecting an amplitude of a signal caused by a phase difference between the applied pair of triangular waveform alternating signals at the center tap with respect to a reference signal derived from said triangular waveform generating means and for outputting separate signals having the same polarities and indicative of the amplitude of the signal at the center tap caused by the phase difference from that of the reference signal;

d) normalization processing means for providing a normalized DC rectified voltage signal according to a difference in amplitudes of the separate signals output from said phase detecting means, an amplitude and polarity of said DC voltage signal respectively corresponding to the magnitude and direction of the torque applied to said shaft portion of said sensing means; and e) temperature change compensating means for compensating a variation in the normalized DC rectified voltage signal from the processing means due to a change of characteristics of each means caused by the change in the temperature with respect to a normal temperature.

2. An apparatus as set forth in claim 1, which further comprises amplifying means for amplifying the voltage signal derived from said center tap of the half bridge circuit with a predetermined amplification factor, the amplified voltage signal being supplied to said phase detecting means and wherein said phase detecting means outputs separate two of positive and negative half-wave rectified signals to said processing means.

3. An apparatus as set forth in claim 2, wherein said processing means comprises voltage biasing means for supplying the reference signal to said phase detector and to said triangular waveform generating means.

4. An apparatus as set forth in claim 3, wherein said temperature change compensating means comprises first means for automatically adjusting the predetermined amplification factor of said amplifying means according to the change in the temperature with respect to tile normal temperature.

5. An apparatus as set forth in claim 4, wherein said amplifying means comprises a first operational amplifier having a non-inverting input end connected to said voltage biasing means, an inverting input end connected to said first means which is connected to said center tap of said half bridge via a capacitor and connected to one end of a first fixed resistor whose other end is connected to an output end of said first operational amplifier, said output end thereof being connected to the phase detecting means.

6. An apparatus as set forth in claim 5, wherein said first means comprises a posistor having a resistance value increased as the ambient temperature is increased with respect to the normal temperature.

7. An apparatus as set forth in claim 6, wherein said processing means comprises a pair of LPFs, with one of the separate negative half-wave rectified signals inverted, which smooth the positive and negative half-wave signals derived from said phase detecting means and a differential amplifier which provides the difference signal between the smoothed LPF passed signals to output the difference signal indicating the magnitude and direction of the torque applied to the shaft portion of the sensing means.

8. An apparatus as set forth in claim 7, wherein said voltage biasing means is connected to the differential amplifier via said temperature change compensating means which comprises an adjuster having a variable resistor, a second fixed resistor, a negative feedback resistor, and a second operational amplifier, a non-inverting input end of said second operational amplifier being connected to said variable resistor, an inverting input end thereof being connected to one end of said negative feedback resistor and one end of said second fixed resistor, an output end thereof being connected to said differential amplifier and to the other end of said negative feedback resistor, one end of said variable resistor being connected to the voltage biasing means, the other end of the variable resistor being connected to the ground together with the other end of said second fixed resistor, and said negative feedback resistor comprising a thermistor having a resistance value decreased as the ambient temperature is increased with respect to the normal temperature so that a second predetermined amplification factor of the second operational amplifier being changed according to the resistance value of the thermistor, thus said differential amplifier providing the normalized DC voltage signal corresponding to the magnitude and direction of the torque applied to said shaft portion of sensing means, the DC voltage signal (J) indicating zero when no torque is applied to the shaft portion of the sensing means although the temperature is changed with respect to the normal temperature.

9. An apparatus as set forth in claim 8, wherein said triangular waveform generating means comprises:

a third operational amplifier having a non-inverting input end connected to said voltage biasing means and to said phase detecting means, an inverting input end connected to a third fixed resistor and a fourth fixed resistor, said third fixed resistor being grounded and said fourth fixed resistor being connected to an output end of said third operational amplifier;

rectangular waveform oscillator which is so constructed as to generate a pair of rectangular waveform voltages having one of the phases 180 degree opposite to the other and the same frequencies of said triangular waveform voltage signals, said one of the pair of rectangular waveform voltages being supplied to said phase detector; and a triangular waveform transform circuit which is so constructed as to provide the pair of the triangular waveform voltage signals in response to the pair of said rectangular waveform voltages.

10. An apparatus as set forth in claim 9, wherein said fourth fixed resistor is replaced with an input temperature-sensitive resistor so that the amplitudes of the pair of triangular waveform voltage signals are adjusted automatically according to the change in temperature with respect to the normal temperature.

11. An apparatus as set forth in claim 10, which further comprises an invertor having a fourth operational amplifier, an inverting input end of the fourth operational amplifier being connected to the output end of said first operational amplifier via a sixth fixed resistor and to a negative feedback resistor, an output end thereof being connected to the phase detecting means, and resistance values of both negative feedback resistor and sixth resistor being equal to each other, so that the phase detecting means detects the phases of the voltage signals derived from said first operational amplifier and from invertor with respect to the reference waveform signal derived from said triangular waveform signal generator.

12. An apparatus as set forth in claim 11, wherein said pair of LPFs provide a full-wave rectified signals from the output voltage signals of said phase detecting means.

13. An apparatus as set forth in claim 12, wherein said triangular waveform transform circuit comprises a first integrating resistor connected to said rectangular wave oscillator, a first integrating capacitor connected between the first integrating resistor and the ground, a second variable integrating resistor, and a second integrating capacitor connected between the second integrating resistor and the ground, and a triangular wave amplifier which is so constructed as to amplify the pair of the triangular waveform signals with a predetermined amplification factor, one of the amplitudes of the pair of triangular waveform voltages being adjusted by means of at least the variable integrating resistor.

14. An apparatus as set forth in claim 13, wherein the normal temperature is approximately 20° C.

15. An apparatus as set forth in claim 14, wherein said frequencies of the pair of triangular waveform voltages are the same and are approximately 30 KHz.

16. An apparatus as set forth in claim 15, wherein said shaft portion comprises an magnetostriction shaft and interposed between an output shaft of an automotive vehicle mounted engine.

17. An apparatus as set forth in claim 16, wherein the output DC voltage signal of the differential amplifier is supplied to a control unit which is so constructed as to control a gear shift of an automatic power transmission associated with the engine.

18. An apparatus as set forth in claim 17, wherein the posistor and thermistor are located in the vicinity to the magnetostriction shaft so as to be susceptible to the same temperature as the magnetostriction shaft.

19. A structure of apparatus, comprising:

sensing circuit means, disposed around a torque sensor, said torque sensor having a magnetostriction shaft around which a pair of coil portions constituting a series-connected half bridge circuit are wound, for operatively generating and outputting an analog signal having an amplitude corresponding to a magnitude of a torque applied to said magnetostriction shaft via a rotatable shaft and having a polarity corresponding to a direction of the torque, said sensing circuit means being set to generate and output a zero signal when an ambient temperature of the sensing circuit means is a normal temperature and when no torque is applied to the magnetostriction shaft via the rotatable shaft and including temperature change compensating means for operatively compensating an error of the analog signal so as to eliminate the error generated due to an occurrence of a change in the ambient temperature with respect to the normal tgemperature.

20. A structure of apparatus as set forth in claim 19, wherein said temperature change compensating means comprises first amplification factor changing means, disposed in amplifying means, said amplifying means amplifying a signal derived from a center tap between the pair of coil portions with the amplification factor and said first amplification factor changing means automatically changing the amplification factor in accordance with the change in the ambient temperature with respect to the normal temperature.

21. A structure of apparatus as set forth in claim 20, wherein said temperature change compensating means comprises second amplification factor changing means, disposed between reference bias voltage supplying means and differential amplifying means, both of said reference bias voltage supplying means and differential amplifying means constituting said sensing circuit means, for operatively changing the amplification factor of the reference bias voltage supply means to the differential amplifying means in accordance with the change in the ambient temperature with respect to the normal temperature.

22. A structure of apparatus as set forth in claim 21, wherein said temperature change compensating means comprises third amplification factor changing means, disposed in triangular waveform signal generating means constituting said sensing circuit means, for operatively changing the amplification factor of said triangular waverform signal generating means so that each amplitude of a pair of triangular waveform signals applied to both ends of the half bridge circuit is the same as those when the ambinent temeprature is the normal temperature, said pair of the triangular wavefrom signals having the same frequencies and having a phase difference from each other by 180 degrees.

23. A structure of apparatus as set forth in claim 22, wherein said first amplification factor changing means compirses a posistor.

24. A structure of apparatus as set forth in claim 23, wherein each of said second and third amplification factor changing means comprises a thermistor.

25. A structure of apparatus as set forth in claim 24, wherein said trinagular waveform signal generating means comprises a pair of integrating circuits having first and second capacitors and first and second resistors both in L-shaped configurations, at least one of said capacitors and resistors being variable to adjust a time constant of one of the pair of triangular waveform signals.

26. A method for generating a torque corresponding signal, comprising the steps of:

a) providing sensing means having a shaft portion and a pair of coil portions, said shaft portion axially interposed between each end of a rotatable shaft and said pair of coil portions constituting a series-connected half bridge circuit, each coil portion having a variable inductance which varies in accordance with a magnitude and direction of a torque applied to said shaft portion;

b) generating a pair of triangular waveforms having phases mutually different from one another by 180 degrees and having the same frequencies and for applying the pair of triangular waveform voltages to both ends of the half bridge circuit so that a center tap of said half bridge circuit provides no signal when no torque is applied to the shaft portion of the sensing means;

c) detecting a phase of the voltage signal derived from the center tap with respect to a reference voltage signal derived from a triangular waveform voltage generator and for outputting a voltage signal indicative of the phase difference from the reference signal;

d) providing a normalized DC voltage signal according to the voltage signal output at said step c), an amplitude of said DC voltage signal corresponding to the magnitude and direction of the torque applied to said shaft portion of said sensing means; and e) compensating a variation in the DC voltage signal derived at the step d) due to a change of characteristics of each circuit caused by the change in the temperature with respect to a normal temperature.

27. An apparatus comprising:

a) sensing means having a magnetostrictive shaft portion and a pair of coil portions, said shaft portion axially interposed between each end of a rotatable shaft and said pair of coil portions constituting a series-connected half bridge circuit, each coil portion having a self inductance which varies in accordance with a magnitude and direction of a torque applied to said shaft portion;

b) triangular waveform generating means for generating a pair of triangular waveform alternating signals having phases mutually different from one another by approximately 180 degrees and having the approximately same frequencies and for applying the pair of triangular waveform alternating signals to both ends of the half bridge circuit so that a center tap of said half bridge circuit provides no signal when no torque is applied to the shaft portion of the sensing means via said rotatable shaft;

c) phase detecting means for detecting an amplitude of a signal caused by a phase difference between the applied pair of triangular waveform alternating signals at the center tap with respect to a reference signal derived from said triangular waveform generating means and for outputting separate signals having the same polarities and indicative of the amplitude of the signal at the center tap caused by the phase difference from that of the reference signal;

d) normalization processing means for providing a normalized DC rectified voltage signal according to a difference in amplitudes of the separate signals output from said phase detecting means, an amplitude and polarity of said DC voltage signal respectively corresponding to the magnitude and direction of the torque applied to said shaft portion of said sensing means;

e) temperature change compensating means for compensating a variation in the normalized DC rectified voltage signal from the processing means due to a change of characteristics of each means caused by the change in the temperature with respect to a normal temperature; and f) amplifying means for amplifying the voltage signal derived from said center tap of the half bridge circuit with a predetermined amplification factor, the amplified voltage signal being supplied to said phase detecting means, wherein said phase detecting means outputs separate two of positive and negative half-wave rectified signals to said processing means, wherein said processing means comprises voltage biasing means for supplying the reference signal to said phase detector and to said triangular waveform generating means, and wherein said temperature change compensating means comprises first means for automatically adjusting the predetermined amplification factor of said amplifying means according to the change in the temperature with respect to the normal temperature.

* * * * *